United States Patent
Suzuki

(10) Patent No.: US 9,337,677 B2
(45) Date of Patent: May 10, 2016

(54) ELECTRIC POWER TOOL POWERED BY BATTERY PACK AND ADAPTER THEREFOR

(75) Inventor: Hitoshi Suzuki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 677 days.

(21) Appl. No.: 13/699,664

(22) PCT Filed: Jun. 8, 2011

(86) PCT No.: PCT/JP2011/063132
§ 371 (c)(1),
(2), (4) Date: Nov. 23, 2012

(87) PCT Pub. No.: WO2012/008244
PCT Pub. Date: Jan. 19, 2012

(65) Prior Publication Data
US 2013/0062955 A1    Mar. 14, 2013

(30) Foreign Application Priority Data

Jul. 16, 2010   (JP) ................................. 2010-161412

(51) Int. Cl.
*H02J 7/00* (2006.01)
*H01M 2/10* (2006.01)
(Continued)

(52) U.S. Cl.
CPC ........... *H02J 7/0063* (2013.01); *H01M 2/1022* (2013.01); *H01M 10/44* (2013.01);
(Continued)

(58) Field of Classification Search
CPC ........... H02J 7/00; H01M 2/10; H01M 10/48; Y10T 307/685

USPC ........................................................... 307/77
See application file for complete search history.

(56) References Cited

U.S. PATENT DOCUMENTS 5,028,858 A    7/1991 Schnizler et al.
6,501,197 B1 *  12/2002 Cornog et al. ................ 307/150
(Continued)

FOREIGN PATENT DOCUMENTS

CN    1388620 A    1/2003
EP    0 528 478 A1  2/1993
(Continued)

OTHER PUBLICATIONS

Guide for V2.5 Packs. (2010). Retrieved from http://www.pingbattery.com/content/wiringguide.pdf.*
(Continued)

*Primary Examiner* — Thienvu Tran
*Assistant Examiner* — David M Stables
(74) *Attorney, Agent, or Firm* — Oliff PLC

(57) ABSTRACT

An adapter is provided with a connecter portion configured to be detachably attached to the main body of the electric power tool and at least one battery receiving portion configured to be detachably attached to the battery pack. The battery pack attached to the battery receiving portion is electrically coupled with the main body of the power tool attached to the connecter portion via a power supply circuit of the adapter. The adapter is provided with a measuring portion configured to measure an index corresponding to a charged level of the battery pack and a signal receiving portion configured to receive an alarm signal outputted from the battery pack, and is configured to stop or restrict power supply to the main body of the electric power tool based upon a measurement by the measuring portion and the alarm signal that is received.

19 Claims, 17 Drawing Sheets

(51) Int. Cl.
  *H02J 1/00* (2006.01)
  *H01M 10/44* (2006.01)
  *H01M 10/46* (2006.01)
  *H01M 10/48* (2006.01)
  *H01M 10/0525* (2010.01)

(52) U.S. Cl.
  CPC ............. *H01M 10/46* (2013.01); *H01M 10/48* (2013.01); *H02J 1/00* (2013.01); *H02J 7/0026* (2013.01); *H02J 7/0031* (2013.01); *H01M 10/0525* (2013.01); *H02J 7/00* (2013.01); *Y10T 307/685* (2015.04)

(56) References Cited

U.S. PATENT DOCUMENTS

| | | | | |
|---|---|---|---|---|
| 2002/0149346 | A1* | 10/2002 | Sakakibara | 320/162 |
| 2002/0175654 | A1 | 11/2002 | Takano et al. | |
| 2004/0066172 | A1 | 4/2004 | Takano et al. | |
| 2006/0087286 | A1 | 4/2006 | Phillips et al. | |
| 2008/0238370 | A1* | 10/2008 | Carrier et al. | 320/134 |
| 2008/0311795 | A1* | 12/2008 | Brotto et al. | 439/628 |
| 2009/0108806 | A1* | 4/2009 | Takano et al. | 320/112 |
| 2010/0176766 | A1 | 7/2010 | Brandner et al. | |
| 2012/0262035 | A1 | 10/2012 | Takano et al. | |

FOREIGN PATENT DOCUMENTS

| | | |
|---|---|---|
| JP | U-3-62783 | 6/1991 |
| JP | A-2000-308268 | 11/2000 |
| JP | A-2002-315198 | 10/2002 |
| JP | A-2007-151348 | 6/2007 |
| JP | A-2008-178278 | 7/2008 |
| RU | 2 392 701 C2 | 6/2010 |
| SU | 1631661 A1 | 2/1991 |
| WO | 2007/102521 A2 | 9/2007 |

OTHER PUBLICATIONS

Office Action issued in Chinese Application No. 201180035047.6 dated Jun. 30, 2014 (with partial translation).
Office Action issued in Russian Patent Application No. 2013106909/07 dated Apr. 17, 2014 (with translation).
Office Action issued in Japanese Patent Application No. 2010-161412 dated Jan. 28, 2014 (with translation).
International Preliminary Report on Patentability issued in International Patent Application No. PCT/JP2011/063132 dated Feb. 12, 2013.
International Search Report issued in International Patent Application No. PCT/JP2011/063132 dated Sep. 13, 2011 (with translation).
Mar. 10, 2016 Search Report issued in European Patent Application No. 11806575.4.

* cited by examiner

ELECTRIC POWER TOOL POWERED BY
BATTERY PACK AND ADAPTER THEREFOR

TECHNICAL FIELD

The present invention relates to an electric power tool powered by a battery pack and an adapter therefor.

BACKGROUND ART

U.S. Pat. No. 5,028,858 discloses an electric power tool that is powered by two battery packs. In this electric power tool, two battery packs are connected in series, and a motor is driven with a high voltage. Due to this, the electric power tool can provide higher power that can be used in heavy work than a case where one battery pack is used as a power supply.

When battery packs are connected in series, large load may be applied to one battery pack. For example, if a charged level is different between two battery packs, one battery pack may be overcharged and may be charged in a reverse direction (i.e. reverse-charged) by the other battery pack. In this case, one battery pack may be damaged severely so that deterioration thereof progresses further or the battery pack may become unusable.

With regard to the above problem, in the above-described electric power tool, a charged level of each of two battery packs is measured, and when the charged level of the battery pack is out of an allowable range, a power supply circuit that supplies power from the battery pack to a motor is electrically disconnected. According to this configuration, it is possible to prevent overdischarging of the battery pack and prevent severe damage to the battery pack. Such a configuration is not limited to an electric power tool in which a plurality of battery packs is connected in series but can be effectively applied to an electric power tool in which a plurality of battery packs is connected in parallel and an electric power tool in which only one battery pack is used.

SUMMARY OF INVENTION

Technical Problem

In recent years, a battery pack that monitors a charged level by itself and has an alarm function that outputs an alarm signal according to a decrease of the charged level and an auto stop function that automatically stops discharging according to a decrease of the charged level has been developed. According to this kind of battery pack, it is possible to eliminate the need for an electric power tool to measure the charged level of a battery pack and to simplify an electrical structure of the electric power tool. However, if an electric power tool is configured to be unable to measure the charged level of a battery pack, when a battery pack of an older model that does not have an alarm function and an auto stop function is used, there is a problem in that the battery pack is overdischarged. Thus, there is a need to provide a technique capable of appropriately preventing overdischarging of a battery pack regardless of whether the battery pack has an alarm function and an auto stop function or not.

Solution to Technical Problem

The present technique is implemented in an adapter for connecting a main body of an electric power tool and at least one battery pack to each other. This adapter includes: a connecter portion configured to be detachably attached to the main body of the power tool; at least one battery receiving portion configured to be detachably attached to the battery pack; a power supply circuit configured to electrically couple the battery pack attached to the battery receiving portion to the main body of the electric power tool attached to the connecter portion; a measuring portion configured to measure an index corresponding to a charged level of the battery pack attached to the battery receiving portion; a signal receiving portion configured to receive an alarm signal output from the battery pack attached to the battery receiving portion; and a controller portion configured to stop or restrict power supply to the main body of the electric power tool based upon a measurement by the measuring portion and the alarm signal that is received.

This adapter can stop or restrict discharging of the battery pack according to the alarm signal output from the battery pack. Moreover, even when the alarm signal is not output from the battery pack, this adapter can stop or restrict discharging of the battery pack according to the charged level of the battery pack measured by itself. Thus, it is possible to prevent overdischarging of the battery pack regardless of whether the battery pack has the alarm function that outputs the alarm signal or not. Further, when the battery pack has the alarm function, it is possible to appropriately stop or restrict discharging, of the battery pack using the alarm signal.

In the adapter, it is preferable that the alarm signal is a signal that the battery pack outputs according to a decrease of the charged level. In this case, it is preferable that the controller portion stops discharging of the battery pack at a point in time when the alarm signal is received.

In the adapter, the measuring portion is preferably configured to measure an output voltage of the battery pack. In the battery pack, the output voltage thereof decreases according to a decrease of the charged level. Thus, it is possible to detect the charged level of the battery pack correctly by measuring the output voltage of the battery pack.

In one embodiment of the adapter, it is preferable that the controller portion is configured to stop or restrict the power supply to the main body of the electric power tool when the alarm signal is received or when the measurement by the measuring portion is out of a predetermined allowable range. In this embodiment, when the alarm signal is received, discharging of the battery pack is stopped or restricted regardless of the measured charged level of the battery pack. On the other hand, when the measurement by the measuring portion is out of the predetermined allowable range, discharging of the battery pack is stopped regardless of whether the alarm signal is received or not. According to this embodiment, the battery pack attached to the adapter can prevent overdischarging of the battery pack without determining whether the battery pack has the alarm function.

In another embodiment of the adapter, it is preferable that the controller portion is configured to be capable of detecting whether or not the battery pack attached to the battery receiving portion has an alarm function that outputs the alarm signal. Moreover, it is preferable that if the battery pack has the alarm function, the controller portion is configured to ignore the measurement by the measuring portion and stop or restrict the power supply to the main body of the electric power tool only when the alarm signal is received. In this embodiment, when the battery pack has the alarm function, the alarm signal output by the battery pack has a higher priority than the charged level measured by the adapter. This is because in many cases, determination by the battery pack provides a more accurate determination result than determination based on the measurement by the adapter.

In the above embodiment of the adapter, it is preferable that the controller portion is configured to be further capable of detecting whether or not the battery pack attached to the battery receiving portion has an auto stop function that automatically stops discharging according a decrease of the charged level. Moreover, it is preferable that the controller portion is configured to ignore the measurement by the measuring portion if the battery pack attached to the battery receiving portion has the auto stop function. In this embodiment, when the battery pack has the auto stop function, a process of allowing the battery pack to spontaneously stop discharging is preferentially performed, and a process of stopping or restricting discharging according to the charged level measured by the adapter is not performed. According to this embodiment, it is possible to appropriately prevent overdischarging of a battery pack that has the alarm function, a battery pack that has the auto stop function, and a battery pack that does not have both functions.

Another adapter implemented by the present technique is an adapter for connecting a main body of an electric power tool and at least one battery pack to each other. The adapter includes: a connecter portion configured to be detachably attached to the main body of the power tool; at least one battery receiving portion configured to be detachably attached to the battery pack; a power supply circuit configured to electrically couple the battery pack attached to the battery receiving portion to the main body of the electric power tool attached to the connecter portion; a measuring portion configured to measure an index corresponding to a charged level of the battery pack attached to the battery receiving portion; and a controller portion configured to stop or restrict power supply to the main body of the electric power tool based upon a measurement by the measuring portion. The controller portion is configured to be capable of detecting whether or not the battery pack attached to the battery receiving portion has an auto stop function that automatically stops discharging according a decrease of the charged level. Moreover, the controller portion is configured to ignore the measurement by the measuring portion if the battery pack attached to the battery receiving portion has the auto stop function. On the other hand, the controller portion is configured to stop or restrict the power supply to the main body of the electric power tool when the measurement by the measuring portion is out of a predetermined allowable range if the battery pack attached to the battery receiving portion does not have the auto stop function.

This adapter can stop discharging of the battery pack according to the measured charged level of the battery pack. However, when the battery pack has the auto stop function, a process of allowing the battery pack to spontaneously stop discharging is preformed preferentially, and a process of stopping or restricting discharging according to the charged level measured by the adapter is not performed. Thus, it is possible to prevent overdischarging of the battery pack regardless of whether the battery pack has the auto stop function or not. Further, as for a battery pack that has the auto stop function, by performing the auto stop function preferentially, it is possible to stop discharging of the battery pack at an appropriate point in time.

In the adapter according to the present technique, a plurality of battery receiving portions may be provided so that a plurality of battery packs can be used. In this case, the power supply circuit is configured to connect the plurality of battery packs attached to the plurality of battery receiving portions in series or in parallel to the main body of the electric power tool.

In a configuration in which the power supply circuit connects the plurality of battery packs in series, the power supply circuit cannot form a closed path unless the battery packs are attached to all battery receiving portions. That is, a device (for example, the controller portion) in the adapter cannot receive power supply from the battery pack when the battery pack is attached to only a portion of the battery receiving portions. The device in the adapter can start its operation only after the battery packs are attached to all battery receiving portions.

In this regard, in one embodiment of the present technique, when the power supply circuit is configured to connect the plurality of battery packs in series, a pair of power input terminals provided to each of the battery receiving portions may be electrically connected via a diode. Here, the pair of power input terminals are terminals which are connected to a positive terminal of the battery pack and a negative terminal of the battery pack. According to this embodiment, the power supply circuit can form a closed path just by attaching the battery pack to a portion of the battery receiving portions, and it is possible to supply power from the battery pack to a device in the adapter.

The technique associated with the adapter described above can be directly applied to an electric power tool. That is, the electric power tool itself may include the configuration associated with the adapter described above.

An electric power tool according to an embodiment of the present technique is an electric power tool powered by at least one battery pack. The electric power tool includes: a motor configured to drive a tool; at least one battery receiving portion configured to be detachably attached to the battery pack; a power supply circuit configured to electrically couple the battery pack attached to the battery receiving portion to the motor; a measuring portion configured to measure an index corresponding to a charged level of the battery pack attached to the battery receiving portion; a signal receiving portion configured to receive an alarm signal output from the battery pack attached to the battery receiving portion; and a controller portion configured to stop or restrict power supply to the motor based upon a measurement by the measuring portion and the alarm signal that is received.

According to this electric power tool, it is possible to prevent overdischarging of the battery pack regardless of whether the battery pack has an alarm function or not. Further, when the battery pack has the alarm function, it is possible to stop or restrict discharging of the battery pack at an appropriate point in time using the alarm signal.

An electric power tool according to another embodiment of the present technique is an electric power tool powered by at least one battery pack. The electric power tool includes: a motor configured to drive a tool; at least one battery receiving portion configured to be detachably attached to the battery pack; a power supply circuit configured to electrically couple the battery pack attached to the battery receiving portion to the motor; a measuring portion configured to measure an index corresponding to a charged level of the battery pack attached to the battery receiving portion; and a controller portion configured to stop or restrict power supply to the motor based upon a measurement by the measuring portion. The controller portion is configured to be capable of detecting whether or not the battery pack attached to the battery receiving portion has an auto stop function that automatically stops discharging according a decrease of the charged level. Moreover, the controller portion is configured to ignore a measurement by the measuring portion if the battery pack attached to the battery receiving portion has the auto stop function, and stop or restrict the power supply to the motor when the measurement by the measuring portion is out of a predetermined allowable range if the battery pack attached to the battery receiving portion does not have the auto stop function.

According to this electric power tool, it is possible to prevent overdischarging of the battery pack regardless of whether the battery pack has the auto stop function or not. Further, when the battery pack has the auto stop function, it is possible to stop discharging of the battery pack at an appropriate point in time by performing the auto stop function preferentially.

DESCRIPTION OF EMBODIMENTS

Embodiment 1

Figure 1:
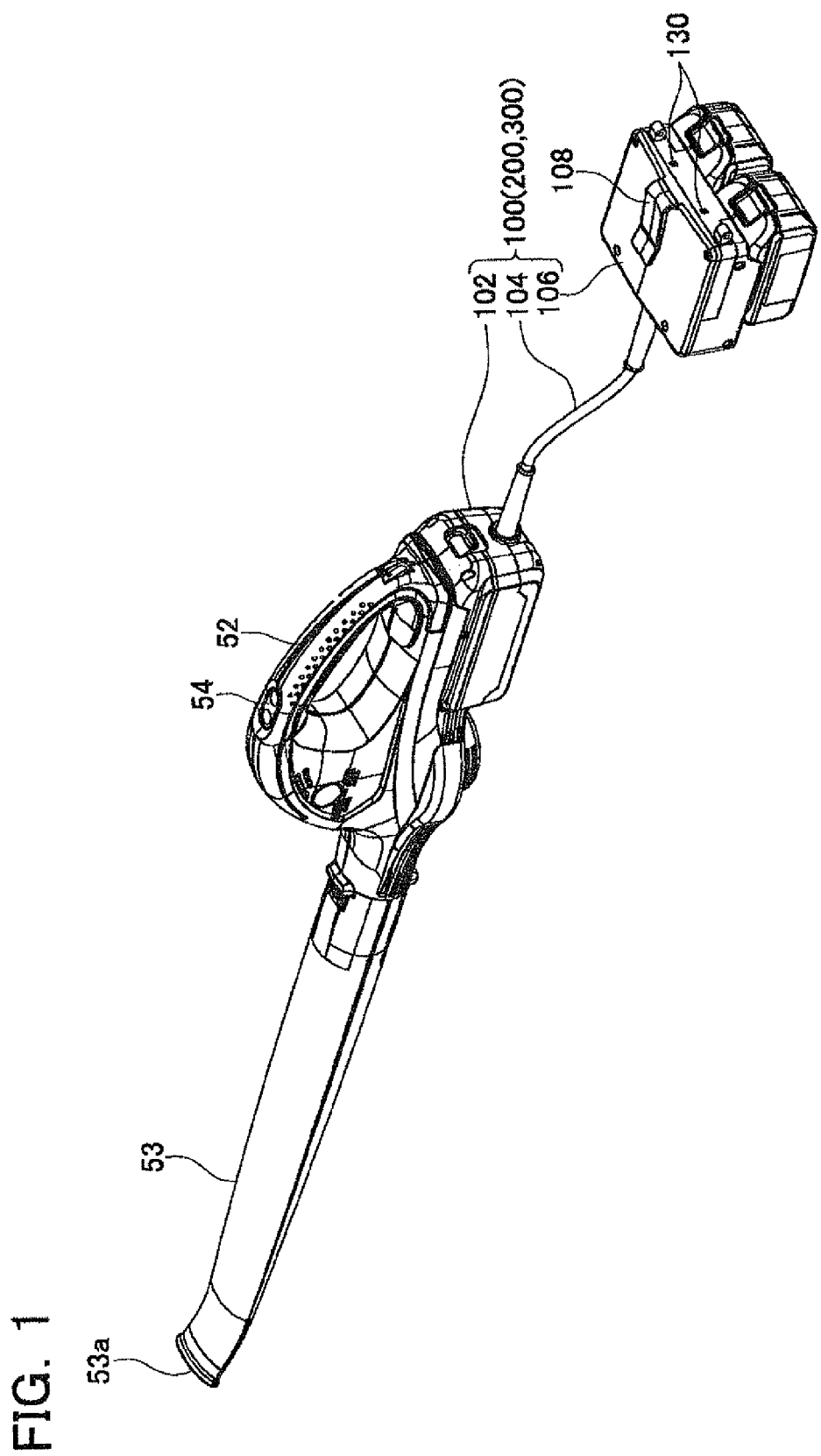
FIG. 1 is an external view illustrating an adapter according to an embodiment.
Figure 2:
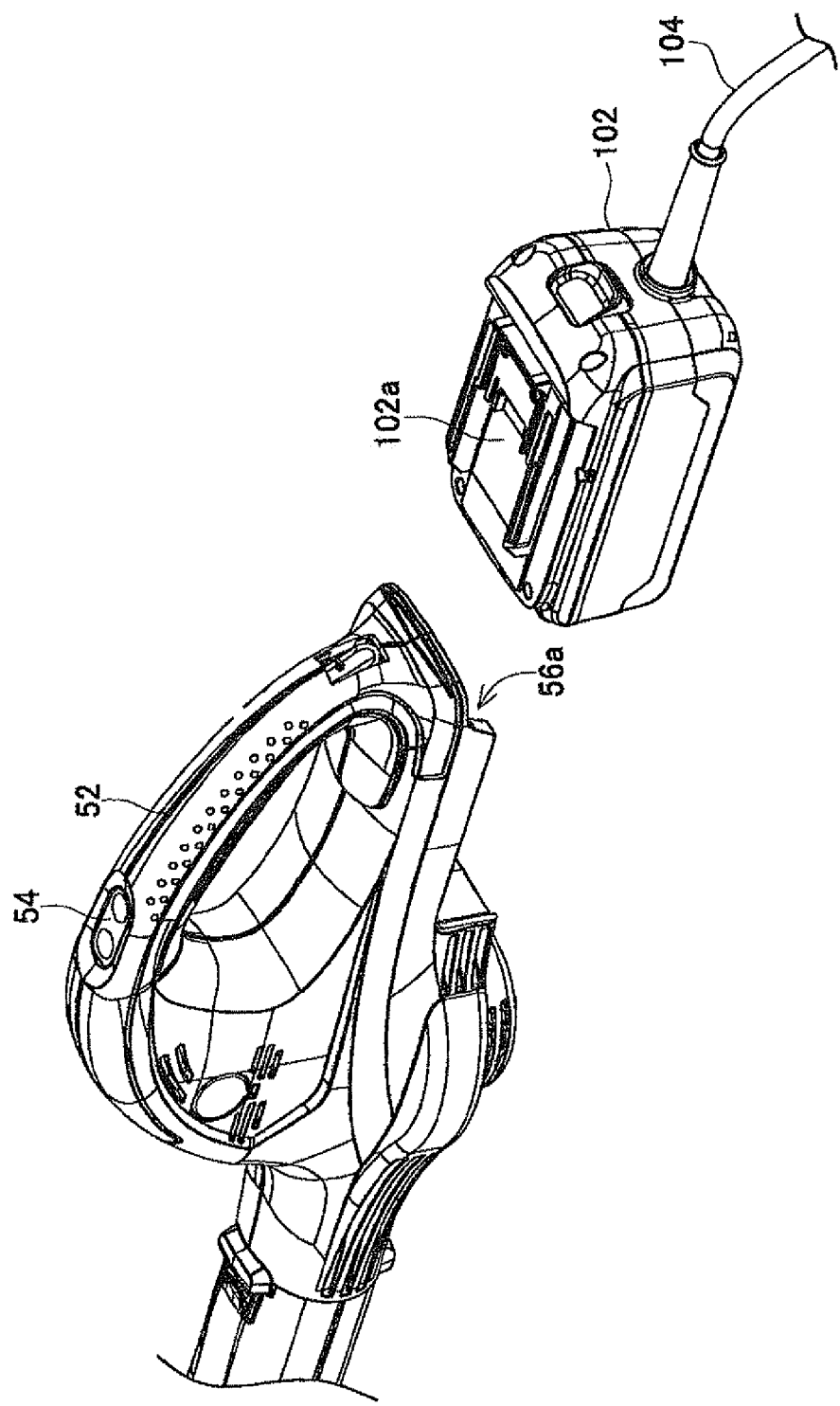
FIG. 2 is an external view illustrating a tool-side unit of the adapter.
Figure 3:
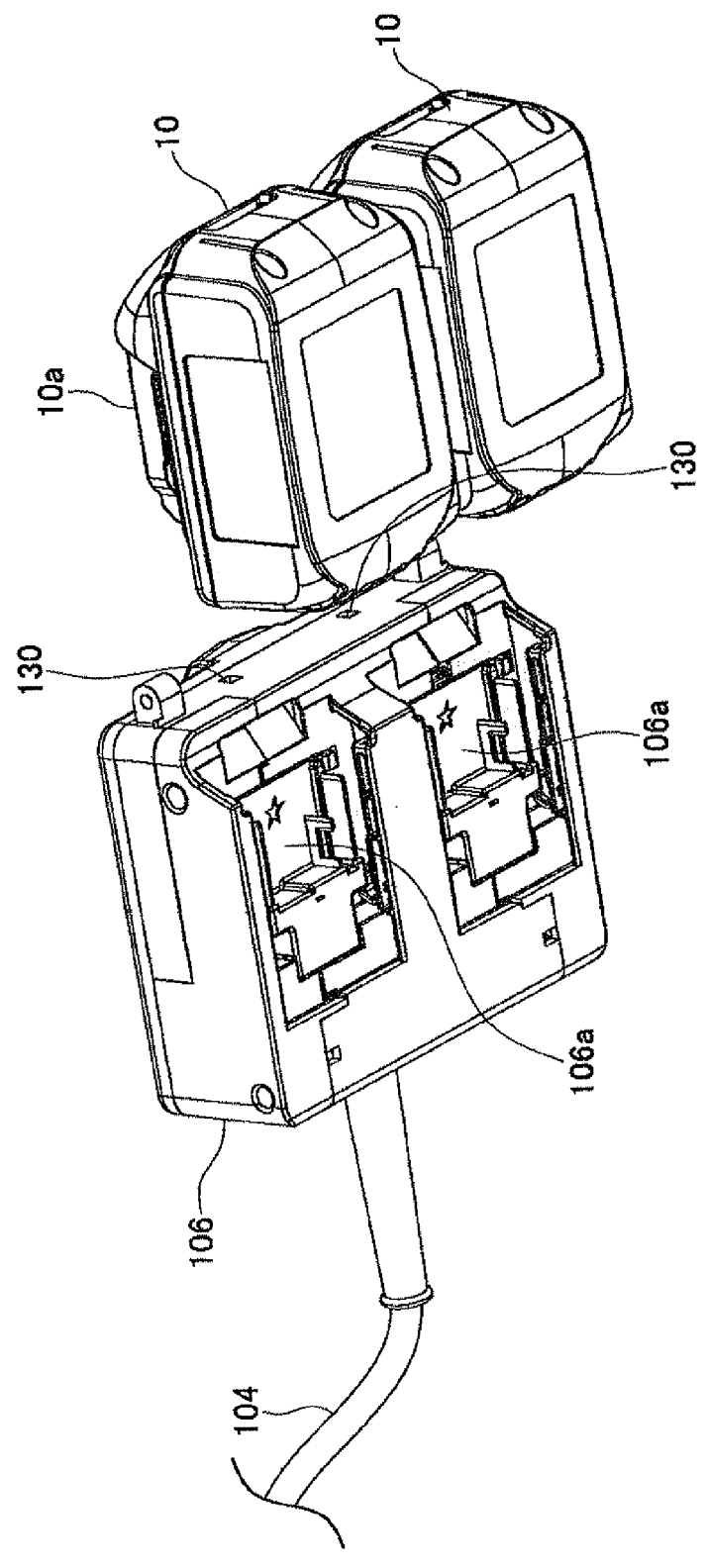
FIG. 3 is an external view illustrating a battery-side unit of the adapter.

An adapter 100 according to a first embodiment will be described with reference to the drawings. FIGS. 1, 2, and 3 illustrate an external appearance of the adapter 100. As illustrated in FIGS. 1, 2, and 3, the adapter 100 is a device for electrically connecting two battery packs 10 to a main body 52 of an electric power tool. Here, a rated voltage of the main body 52 of the electric power tool is 36 volts, and a nominal voltage of each battery pack 10 is 18 volts. In general, the main body 52 of the electric power tool uses a battery pack having a nominal voltage of 36 volts and cannot use a battery pack having a nominal voltage of 18 volts. However, according to the adapter 100 of the present embodiment, it is possible to use an electric power tool having a rated voltage of 36 volts using two battery packs 10 having a nominal voltage of 18 volts without requiring a battery pack having a nominal voltage of 36 volts.

The technique described in this specification can be applied to electric power tools having various rated voltages and battery packs having various nominal voltages without being limited to a specific rated voltage and a specific nominal voltage. Moreover, the technique described in this specification can be applied to an adapter for connecting one or three or more battery packs to a main body of an electric power tool.

An example of the main body 52 of the electric power tool illustrated in the figures is a main body of an electric power blower. This electric power tool drives a blast fan included in the main body 52 according to an operation on a main switch 54 and blows air from a distal end 53a of a nozzle 53. The electric power blower is an electric power tool that is used mainly outdoor and is used for a work of blowing and collecting fallen leaves and garbage. The adapter 100 is not limited to an electric power blower but can be widely used in various cordless electric power tools that are powered by a battery pack.

As illustrated in FIG. 1, the adapter 100 includes a tool-side unit 102 that is configured to be detachably attached to the main body 52 of the electric power tool, a battery-side unit 106 to which two battery packs 10 can be detachably attached, and an electric cord 104 that connects the tool-side unit 102 and the battery-side unit 106 to each other. As illustrated in FIG. 2, a connecter portion 102a is formed in the tool-side unit 102. The connecter portion 102a detachably engages with a battery receiving portion 56a that is formed in the main body 52 of the electric power tool. Here, the battery receiving portion 56a formed in the main body 52 of the electric power tool is configured such that the battery pack having a nominal voltage of 36 volts is detachably attached thereto and has a structure such that the battery pack 10 having a nominal voltage of 18 volts is not directly attached thereto.

As illustrated in FIG. 3, two battery receiving portions 106a are formed in the battery-side unit 106. Each battery receiving portion 106a detachably engages with the connecter portion 10a of the battery pack 10. Due to this, it is possible to detachably attach the battery pack 10 having a nominal voltage of 18 volts to each battery receiving portion 106a. The two battery packs 10 attached to the battery-side unit 106 are electrically connected to the main body 52 of the electric power tool that is attached to the tool-side unit 102, and power from the two battery packs 10 is supplied to the main body 52 via the adapter 100.

Two indicators 130 are formed in the battery-side unit 106. The two indicators 130 are positioned in an upper portion of the two battery receiving portions 106a. An example of each indicator 130 is a light emitting diode. One indicator 130 displays a charged level of the battery pack 10 attached to one battery receiving portion 106a, and the other indicator 130 displays a charged level of the battery pack 10 attached to the other battery receiving portion 106a. Moreover, as illustrated in FIG. 1, a hook 108 for allowing a user to hang the battery-side unit 106 on a belt or the like is formed in the battery-side unit 106.

Figure 4:
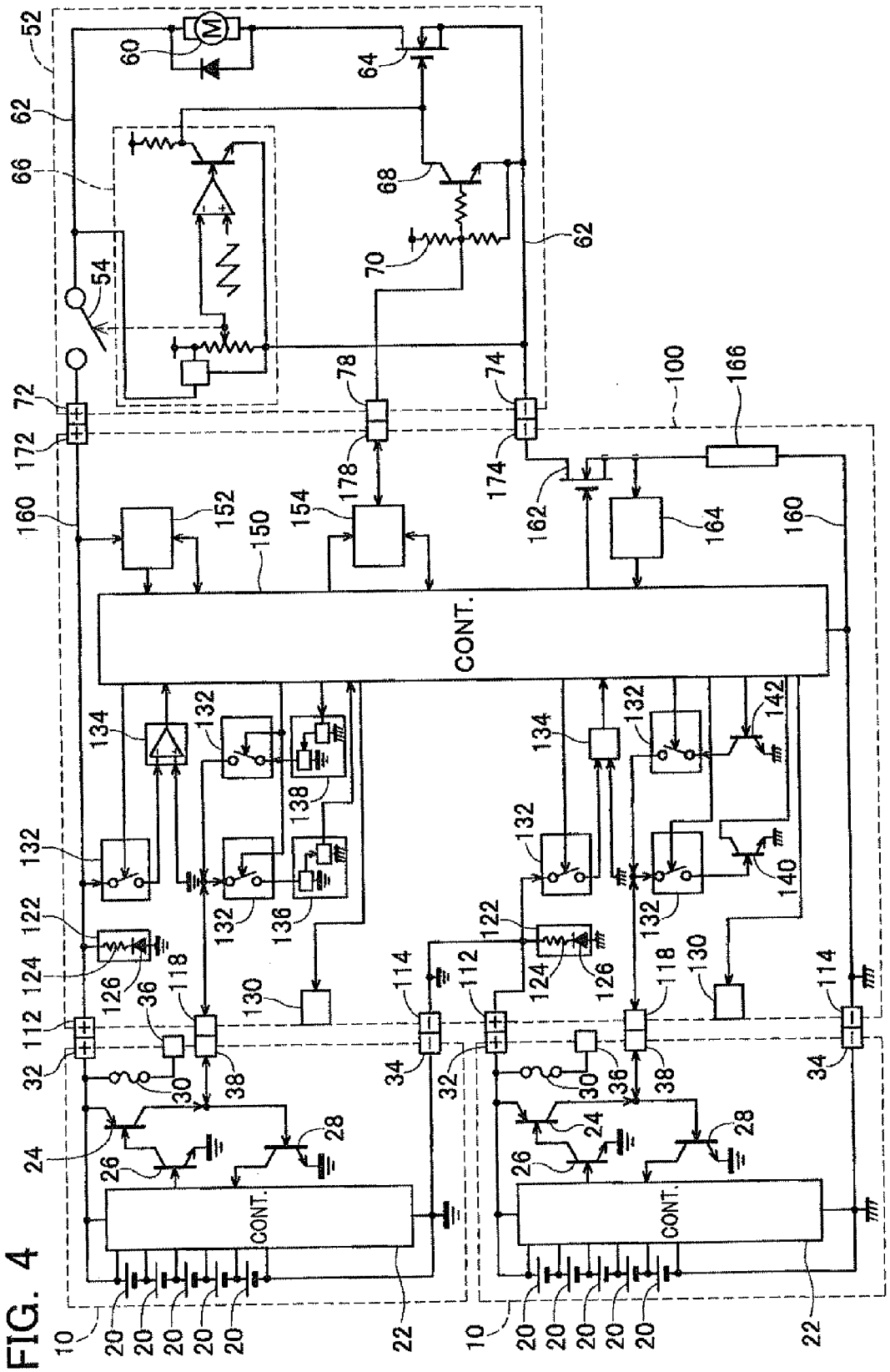
FIG. 4 is a view illustrating a circuit configuration of an adapter, a main body of an electric power tool, and a battery pack (with an alarm function) according to a first embodiment.

FIG. 4 illustrates a circuit configuration of the main body 52 of the electric power tool, the battery pack 10, and the adapter 100. First, a circuit configuration of the main body 52 of the electric power tool will be described. As illustrated in FIG. 4, the main body 52 of the electric power tool includes a motor 60, a power supply circuit 62, the main switch 54, a speed adjustment circuit 66, a power FET 64, a transistor 68, a voltage divider circuit 70, a positive input terminal 72, a negative input terminal 74, and an alarm terminal 78.

The positive input terminal 72, the negative input terminal 74, and the alarm terminal 78 are disposed in the battery receiving portion 56a of the main body 52 of the electric power tool and are electrically connected to the adapter 100 that is attached to the battery receiving portion 56a. The positive input terminal 72 and the negative input terminal 74 are electrically connected to the motor 60 by the power supply circuit 62, and power input from the adapter 100 is supplied to the motor 60 via the power supply circuit 62. The motor 60 is a prime mover that drives a tool (in this example, a blast fan). The main switch 54 and the power FET 64 are provided in the power supply circuit 62. The main switch 54 and the power FET 64 are turned on and off, whereby the power supply circuit 62 can be electrically opened and closed.

The speed adjustment circuit 66 interlocks with the main switch 54. When the user turns on the main switch 54, the speed adjustment circuit 66 outputs an ON signal to a gate terminal of the power FET 64. As a result, the main switch 54 and the power FET 64 are all turned on, and the power supply circuit 62 is electrically closed (connected). Here, the speed adjustment circuit 66 may perform PWM control on the power FET 64. That is, the speed adjustment circuit 66 intermittently turns on the power FET 64 and changes an ON period of the power PET 64 according to an amount of the operation that the user applies to the main switch 54. As a result, a rotating speed of the motor 60 is adjusted according to the amount of the operation applied to the main switch 54.

The gate terminal of the power FET 64 is connected to the power supply circuit 62 that is connected to the negative input terminal 74 via the transistor 68. Moreover, the alarm terminal 78 is connected to the gate of the transistor 68 via the voltage divider circuit 70. An alarm signal output by the adapter 100 is input to the alarm terminal 78. When the alarm signal is input to the alarm terminal 78, the transistor 68 is turned on, and the gate terminal of the power FET 64 is connected to the negative input terminal 74 having a low level (zero volts). As a result, the power FET 64 is turned off and the driving of the motor 60 is stopped regardless of the ON signal from the speed adjustment circuit 66. In this manner, the main body 52 of the electric power tool is configured to stop the driving of the motor 60 when the alarm signal output by the adapter 100 is received.

Next, a circuit configuration of the battery pack 10 will be described. The battery pack 10 includes five battery cells 20 that are connected in series, a battery controller 22, a first transistor 24, a second transistor 26, a third transistor 28, a fuse 30, a positive output terminal 32, a negative output terminal 34, a high-level signal terminal 36, and an alarm terminal 38.

The positive output terminal 32, the negative output terminal 34, the high-level signal terminal 36, and the alarm terminal 38 are disposed in the connecter portion 10a of the battery pack 10, and are electrically connected to the adapter 100 to which the battery pack 10 is attached. The positive output terminal 32 and the negative output terminal 34 are electrically connected to the five battery cells 20 and outputs power discharged from the five battery cells 20 to the adapter 100. An example of each battery cell 20 is a lithium-ion cell, and a nominal voltage thereof is 3.6 volts. The battery pack 10 may include an optional number (one or a plurality) of battery cells 20 without being limited to five battery cells 20.

The high-level signal terminal 36 is connected to the positive output terminal 32 via the fuse 30 and outputs a high-level signal (in this example, 18 volts). The high-level signal terminal 36 is a terminal used by a battery charger that charges the battery pack 10 and is not used depending on the adapter 100.

The alarm terminal 38 is connected to the battery controller 22 via three transistors 24, 26, and 28. The alarm terminal 38 is a terminal from which the alarm signal is output to the adapter 100 and is a terminal to which an alarm cancel signal from the adapter 100 is input. The battery controller 22 monitors the charged level of each battery cell 20 by measuring a voltage of each battery cell 20. Moreover, when the charged level of at least one battery cell 20 is out of an allowable range, the battery controller 22 determines that discharging is to be stopped and outputs the alarm signal from the alarm terminal 38. The battery controller 22 outputs the alarm signal continuously until the alarm cancel signal is input from the adapter 100. In this manner, the battery pack 10 has an alarm function that outputs the alarm signal according to a decrease of the charged level thereof.

Next, an exemplary operation of outputting the alarm signal and an exemplary operation of receiving the alarm cancel signal by the battery pack 10 will be described. When there is no problem in the charged level of the battery cell 20, the battery controller 22 turns on the second transistor 26. When the second transistor 26 is turned on, the first transistor 24 is turned on, and the alarm terminal 38 outputs a high-level signal. This high-level signal is not an alarm signal but is a signal that indicates that the battery pack 10 is in a usable state. From this state, when it is determined that discharging is to be stopped, the battery controller 22 turns off the second transistor 26. When the second transistor 26 is turned off, the second transistor 24 is also turned off, and the alarm terminal 38 is electrically isolated within the battery pack 10. That is, the alarm terminal 38 outputs a high impedance signal. This high impedance signal is the alarm signal that is output by the battery pack 10.

On the other hand, the alarm cancel signal from the adapter 100 is received using the third transistor 28. As described above, when there is no problem in the charged level of the battery cell 20, the first transistor 24 is turned on. When the first transistor 24 is in the ON-state, the third transistor 28 is also turned on, and a signal having a low level (zero volts) is input from the third transistor 28 to the battery controller 22. From this state, when the battery controller 22 turns off the second transistor 26 in order to output the alarm signal, the first and third transistors 24 and 28 are also turned off. As a result, a high impedance signal is input from the third transistor 28 to the battery controller 22. After that, when the alarm cancel signal is input from the adapter 100 to the alarm terminal 38, the third transistor 28 is turned on again. Here, the alarm cancel signal of the adapter 100 is a high-level signal. When the third transistor 28 is turned on, a low-level signal is input again from the third transistor 28 to the battery controller 22. Upon receiving this low-level signal, the battery controller 22 turns on the second transistor 26 and stops outputting the alarm signal.

Next, a circuit configuration of the adapter 100 will be described. The adapter 100 includes two positive input terminals 112, two negative input terminals 114, two battery-side alarm terminals 118, a main controller 150, an alarm input/ output circuit 154, a power supply circuit 160, a power FET 162, a current detection circuit 164, a shunt resistor 166, a positive output terminal 172, a negative output terminal 174, and a tool-side alarm terminal 178.

One positive input terminal 112, one negative input terminal 114, and one battery-side alarm terminal 118 are disposed in one battery receiving portion 106a and are electrically connected to the positive output terminal 32, the negative output terminal 34, and the alarm terminal 38 of one battery pack 10, respectively. The other positive input terminal 112, the other negative input terminal 114, and the other battery-side alarm terminal 118 are disposed in the other battery receiving portion 106a and are electrically connected to the positive output terminal 32, the negative output terminal 34, and the alarm terminal 38 of the other battery pack 10, respectively. The positive output terminal 172, the negative output terminal 174, and the tool-side alarm terminal 178 are disposed in the connecter portion 102a and are electrically connected to the positive input terminal 72, the negative input terminal 74, and the alarm terminal 78 of the main body 52 of the electric power tool, respectively.

The power supply circuit 160 electrically connects the positive input terminal 112 disposed in one battery receiving portion 106a to the positive output terminal 172. The power supply circuit 160 electrically connects the negative input terminal 114 disposed in one battery receiving portion 106a to the positive input terminal 112 disposed in the other battery receiving portion 106a. The power supply circuit 160 electrically connects the negative input terminal 114 disposed in the other battery receiving portion 106a to the negative output terminal 174. Due to this, the two battery packs 10 attached to the adapter 100 are connected in series to the main body 52 of the electric power tool, and power is supplied to the motor 60 of the main body 52 by a voltage of approximately 36 volts. The power from the two battery packs 10 is also supplied to the main controller 150 via a power circuit 152.

The power FET 162 and the shunt resistor 166 are provided in the power supply circuit 160. A voltage corresponding to current that flows in the power supply circuit 160 is generated in the shunt resistor 166. The voltage generated in the shunt resistor 166 is input to the main controller 150 via the current detection circuit 164. When the input voltage exceeds an allowable range, first, the main controller 150 outputs an alarm signal from the tool-side alarm terminal 178 to the main body 52 of the electric power tool. As described above, in the main body 52 of the electric power tool, when the alarm signal is output from the adapter 100, the power FET 64 is turned off, the driving of the motor 60 is stopped, and the discharging of the battery pack 10 is inhibited. Here, it will be assumed that due to a certain reason, a current discharged from the battery pack 10 is detected even after the adapter 100 outputs the alarm signal. In this case, the main controller 150 turns off the power FET 162 in the adapter 100 and electrically opens (disconnects) the power supply circuit 160. As a result, it is possible to reliably prevent an excessively large amount of current from flowing in the battery pack 10 and the motor 60. The adapter 100 may be configured to turn off the power FET 162 without outputting the alarm signal to the main body 52 of the electric power tool. According to this configuration, the main body 52 of the electric power tool does not always need to include the alarm terminal 78. Here, even when the power FET 162 is turned off, power is continuously supplied from the battery pack 10 to the main controller 150. The power FET 162 may be a different type of switching element.

The main controller 150 is electrically connected to the battery-side alarm terminal 118 and is capable of receiving the alarm signal from the battery pack 10. Moreover, the main controller 150 may output the alarm cancel signal to the battery pack 10 from the battery-side alarm terminal 118 to the battery pack 10. Upon receiving the alarm signal from the battery pack 10, the main controller 150 outputs the alarm signal from the tool-side alarm terminal 178 to the main body 52 of the electric power tool. As a result, the power FET 64 in the main body 52 is turned off, and power supply from the battery pack 10 to the motor 60 is stopped. In this case, the main controller 150 lights up the indicator 130 corresponding to the battery pack 10 that outputs the alarm signal to inform the user of the fact that replacement or charging of the battery pack 10 is necessary. Here, even after the alarm signal is output, when current discharged from the battery pack 10 is detected, the main controller 150 turns off the power FET 162 in the adapter 100 and electrically opens (disconnects) the power supply circuit 160. The main controller 150 may be configured to turn off the power FET 162 without outputting the alarm signal to the main body 52 of the electric power tool. According to this configuration, the main body 52 of the electric power tool does not always need to include the alarm terminal 78.

A cut-off switch 132 is provided between the main controller 150 and the battery-side alarm terminal 118. The cut-off switch 132 is turned on and off by the main controller 150. The main controller 150 turns off the cut-off switch 132 when the electric power tool is not used for a predetermined period. As a result, discharging of the battery pack 10 due to leakage current is inhibited, and overdischarging of the battery pack 10 is prevented. Further, the main controller 150 stops the operation of the power circuit 152 and also stops the operation thereof.

A step-down level shifter 136 and a step-up level shifter 138 are provided between one battery-side alarm terminal 118 and the main controller 150. This is because the two battery packs 10 are connected in series, and thus, a reference voltage (the voltage of the negative output terminal 34 of the battery pack 10 located on the upper side of FIG. 4) of the battery pack 10 located on the high-voltage side is different from a reference voltage of the main controller 150. Therefore, the step-down level shifter 136 converts the alarm signal output by the battery pack 10 to a voltage level that is suitable for the main controller 150. On the other hand, the step-up level shifter 138 converts the alarm cancel signal output by the main controller 150 to a voltage level that is suitable for the battery controller 22. As a result, signals can be properly transferred between the main controller 150 and the battery controller 22 having different reference voltages. On the other hand, this kind of level shifters are not required in the battery pack 10 located on the low-voltage side. As in the present embodiment, the battery-side alarm terminal 118 and the main controller 150 may be connected via transistors 140 and 142.

The main controller 150 is electrically connected to the tool-side alarm terminal 178. Upon receiving the alarm signal from the battery pack 10, the main controller 150 outputs the alarm signal from the tool-side alarm terminal 178 to the main body 52 of the electric power tool. As described above, in the main body 52 of the electric power tool, when the alarm signal is output from the adapter 100, the power FET 64 is turned off, and driving of the motor 60 is inhibited. Moreover, the main controller 150 may receive the alarm cancel signal from the main body 52 of the electric power tool via the tool-side alarm terminal 178. Upon receiving the alarm cancel signal from the main body 52 of the electric power tool, the main controller 150 outputs the alarm cancel signal from the battery-side alarm terminal 118 to the battery pack 10.

The adapter 100 further includes two measuring portions 134. One measuring portion 134 is connected to the positive input terminal 112 and the negative input terminal 114 disposed in one battery receiving portion 106a and is capable of measuring an output voltage of the battery pack 10 attached to one battery receiving portion 106a. Here, a reference voltage of the battery pack 10 (the battery pack 10 located on the upper side of FIG. 4) located on the high-voltage side is a voltage at the negative output terminal 34 of the battery pack 10 and is different from the reference voltage of the main controller 150. Thus, the measuring portion 134 cannot directly measure the output voltage of the battery pack 10. Therefore, one measuring portion 134 (one located on the upper side of FIG. 4) that measures the battery pack 10 located on the high-voltage side performs level-shifting using a differential circuit to measure the output voltage of the battery pack 10. The other measuring portion 134 is connected to the positive input terminal 112 and the negative input terminal 114 disposed in the other battery receiving portion 106a and is capable of measuring the output voltage of the battery pack 10 attached to the other battery receiving portion 106a.

The measurement by each measuring portion 134 is input to the main controller 150. The measurement by the measuring portion 134 corresponds to the charged level of the battery pack 10. When the measurement by at least one measuring portion 134 is out of an allowable range that is stored in advance (specifically, when the measurement is lower than an allowable value that is stored in advance), the main controller 150 outputs the alarm signal from the tool-side alarm terminal 178 to the main body 52 of the electric power tool. As a result, the power FET 64 in the main body 52 is turned off, and power supply from the battery pack 10 to the motor 60 is stopped. In this case, the main controller 150 lights up the indicator 130 corresponding to the battery pack 10 of which the measurement is abnormal to inform the user of the fact that replacement or charging of the battery pack 10 is necessary. Here, even after the alarm signal is output, when current discharged from the battery pack 10 is detected, the main controller 150 turns of the power FET 162 in the adapter 100 and electrically opens (disconnects) the power supply circuit 160. The main controller 150 may be configured to turn off the power FET 162 without outputting the alarm signal to the main body 52 of the electric power tool. According to this configuration, the main body 52 of the electric power tool does not always need to include the alarm terminal 78.

As described above, the adapter 100 can stop the discharging of the battery pack 10 according to the alarm signal output by the battery pack 10. Moreover, even when the alarm signal is not output from the battery pack 10, it is possible to stop the discharging of the battery pack 10 according to the measured output voltage or discharge current of the battery pack 10. As a result, it is possible to protect the battery pack 10. Even when the power FET 162 is turned off, electrical connection between the main controller 150 and the battery pack 10 is maintained. That is, even after the power FET 162 is turned off, the main controller 150 can operate continuously with the power from the battery pack 10.

Figure 5:
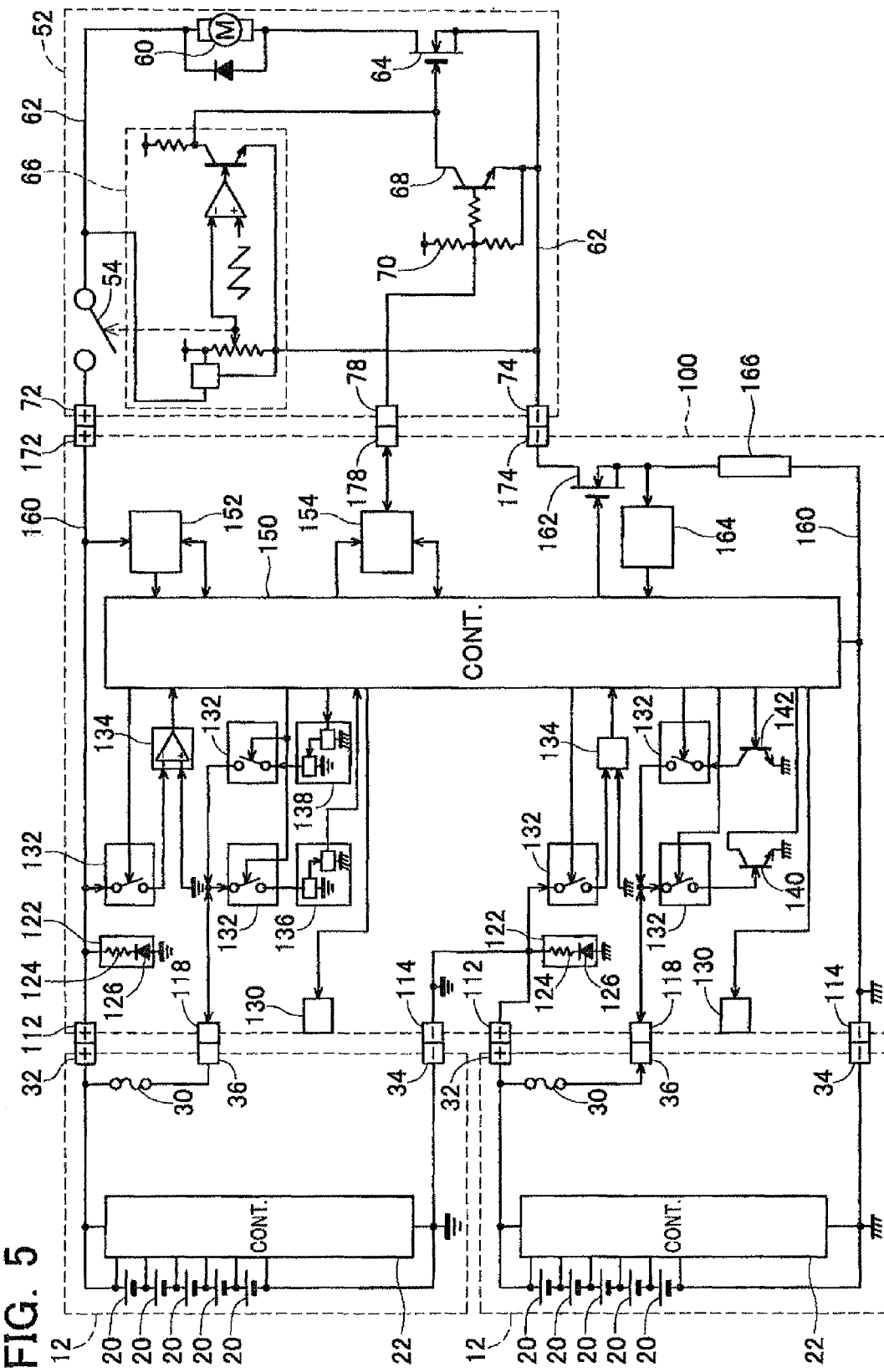
FIG. 5 is a view illustrating a circuit configuration of the adapter, the main body of the electric power tool, and the battery pack (without an alarm function) according to the first embodiment.

As illustrated in FIG. 5, in the adapter 100, a battery pack 12 that does not have an alarm function as well as the battery pack 10 that has the alarm function may be attached to each battery receiving portion 106a. Even when the battery pack 12 does not have the alarm function, the adapter 100 can output an alarm signal from the tool-side alarm terminal 178 to the main body 52 of the electric power tool according to the output voltage of the battery pack 10, turn off the power FET 64 in the main body 52, and stop power supply from the battery pack 12 to the main body 52. Thus, the adapter 100 can prevent overdischarging of the battery packs 10 and 12 regardless of whether the battery packs 10 and 12 have the alarm function or not. When the battery pack 10 has the alarm function, it is possible to stop the discharging of the battery pack 10 at an appropriate point in time using the alarm signal. The battery pack 10 that has the alarm function and the battery pack 12 that does not have the alarm function may be both attached to the adapter 100.

In the present embodiment, when the overdischarging of the battery pack 10 is prevented, the alarm signal is output from the tool-side alarm terminal 178 to the main body 52 of the electric power tool, and the power FET 64 in the main body 52 is turned off to completely stop power supply to the motor 60. However, it is not necessary to stop the power supply to the motor 60 completely, but the power supply to the motor 60 may be partially restricted by intermittently turning on and off the power FET 162. By doing so, it is also possible to prevent the overdischarging of the battery pack 10 significantly.

The adapter 100 of the present embodiment further includes two bypass circuits 122. One bypass circuit 122 electrically connects the positive input terminal 112 and the negative input terminal 114 that are provided in one battery receiving portion 106a. The other bypass circuit 122 electrically connects the positive input terminal 112 and the negative input terminal 114 that are provided in the other battery receiving portion 106a. Each bypass circuit 122 has a resistor element 124 and a diode 126. A cathode of the diode 126 is connected to the positive input terminal 112 via the resistor element 124, and an anode of the diode 126 is connected to the negative input terminal 114.

It will be assumed that the adapter 100 does not include the bypass circuit 122. In this case, if one of the battery packs 10, 12 is attached to only one battery receiving portion 106a, the main controller 150 cannot receive power supply from the battery pack 10 or 12. This is because in the battery receiving portion 106a to which the other of the battery packs 10, 12 is not attached, the positive input terminal 112 and the negative input terminal 114 are not electrically connected to each other, and the power supply circuit 160 cannot form a closed path in relation to the main controller 150. In contrast, according to the adapter 100 of the present embodiment, in the battery receiving portion 106a to which neither of the battery packs 10, 12 is attached, the positive input terminal 112 and the negative input terminal 114 are electrically connected to each other via the bypass circuit 122. Thus, when one of the battery packs 10, 12 is attached to at least one battery receiving portion 106a, the main controller 150 can receive power supply from the battery pack 10 or 12 and start its operation.

Since the bypass circuit 122 includes the diode 126, in the battery receiving portion 106a to which the battery pack 10 or 12 is attached, the bypass circuit 122 is substantially in a cut-off state. Thus, when two battery packs 10 and 12 are attached to the adapter 100 and power is supplied to the motor 60, a large amount of current flowing to the motor 60 will not flow into the bypass circuit 122. However, when an instantaneous contact fault (so-called chattering) of terminals occurs between the battery packs 10 and 12 and the adapter 100, current flowing into the motor 60 may flow into the bypass circuit 122. Therefore, in the bypass circuit 122 of the present embodiment, the resistor element 124 is provided so as to restrict current flowing into the bypass circuit 122.

Embodiment 2

An adapter 200 according to a second embodiment will be described with reference to FIGS. 6, 7, and 8. In the adapter 200 of the second embodiment, two ID terminals 220, two cut-off switches 232, and two level shifters 236 and 238 are added to the configuration of the adapter 100 of the first embodiment. Moreover, a portion of the program of the main controller 150 is modified. Since the other constituent components are the same as those of the first embodiment, these constituent components will be denoted by the same reference numerals as those of the first embodiment, and overlapping description thereof will not be provided.

One ID terminal 220 is provided in one battery receiving portion 106a, and the other ID terminal 220 is provided in the other battery receiving portion 106a. The ID terminal 220 is electrically connected to the main controller 150. Two cut-off switches 232 and two level shifters 236 and 238 are provided between one ID terminal 220 and the main controller 150. The purpose and function of these cut-off switches 232 and the level shifters 236 and 238 are the same as those of the cut-off switch 132 and the level shifters 136 and 138 described in the first embodiment.

Figure 6:
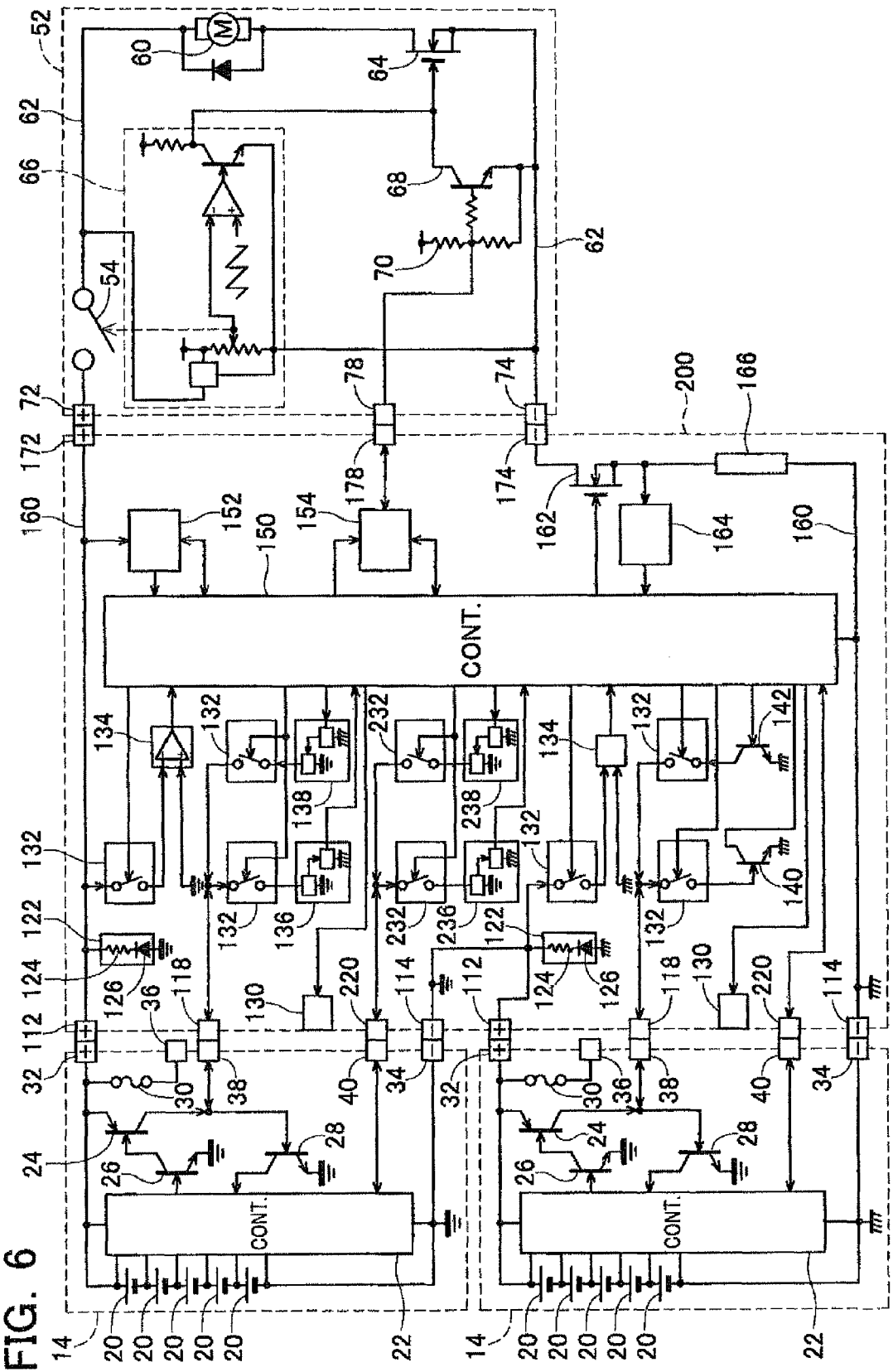
FIG. 6 is a view illustrating an adapter, a main body of an electric power tool, and a battery pack (with an alarm function and an ID terminal) according to a second embodiment.
Figure 7:
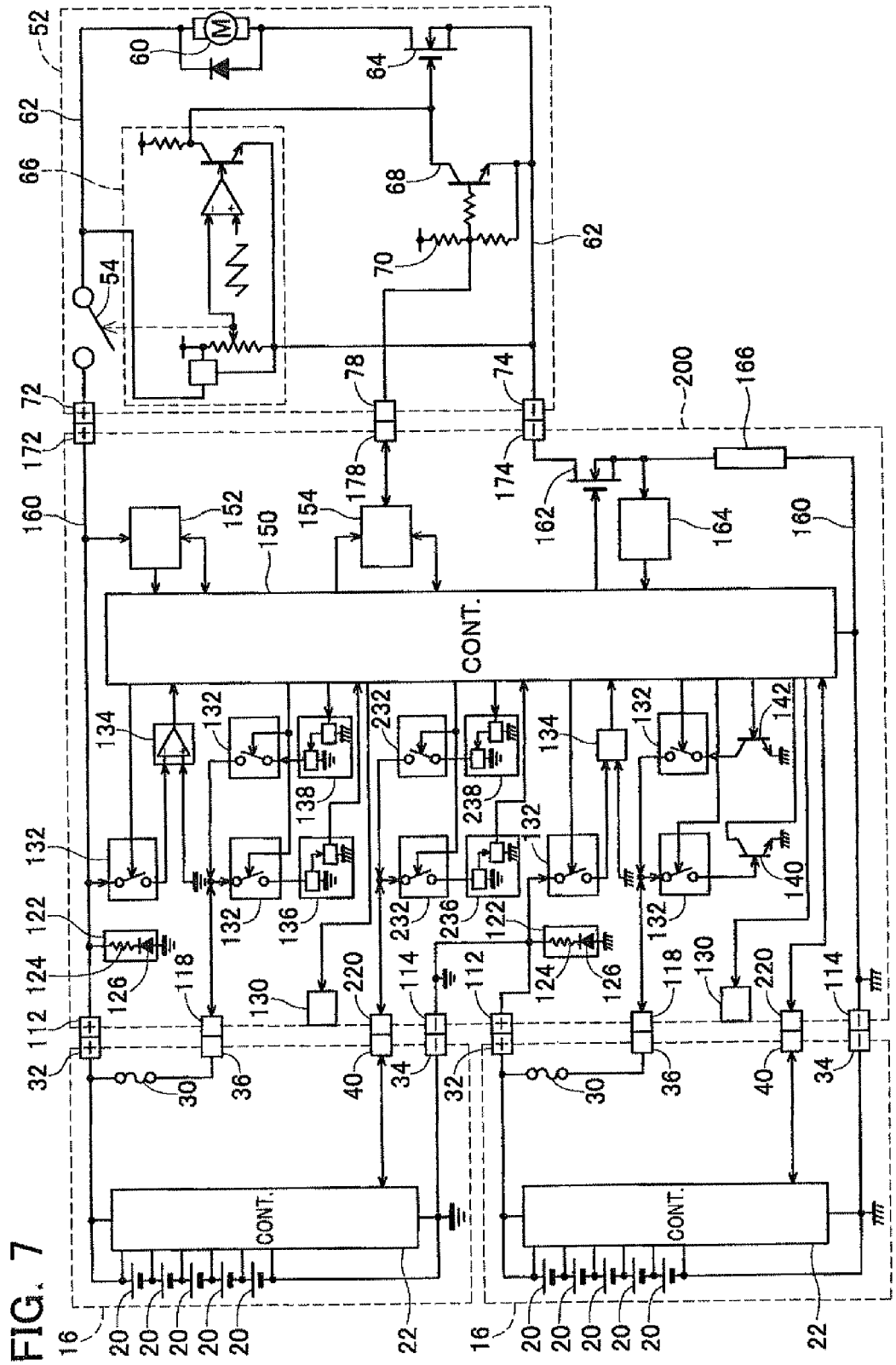
FIG. 7 is a view illustrating a circuit configuration of the adapter, the main body of the electric power tool, and the battery pack (without an alarm function and with an ID terminal) according to the second embodiment.
Figure 8:
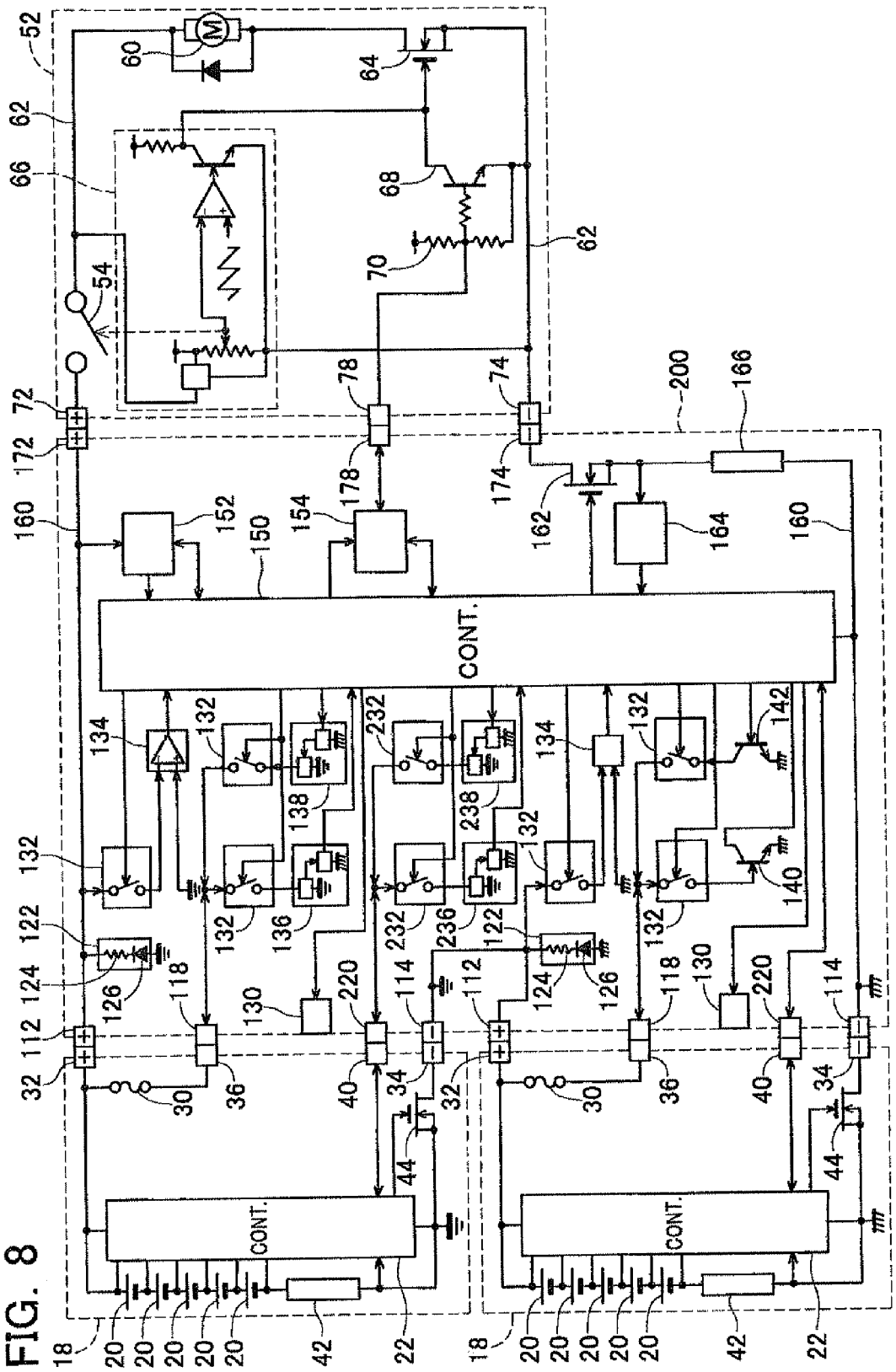
FIG. 8 is a view illustrating a circuit configuration of the adapter, the main body of the electric power tool, and the battery pack (with an auto stop function and an ID terminal) according to the second embodiment.

As illustrated in FIGS. 6, 7, and 8, battery packs 14, 16, and 18 having an ID terminal 40 can be attached to the adapter 200 of the present embodiment. In these battery packs 14, 16, and 18, the ID terminal 40 is connected to the battery controller 22, and the battery controller 22 can output ID information stored therein from the ID terminal 40. The ID terminal 220 of the adapter 200 is connected to the ID terminal 40 of each of the battery packs 14, 16, and 18, and the ID information output by the battery packs 14, 16, and 18 is received by the main controller 150 of the adapter 200. The main controller 150 determines which function do the battery packs 14, 16, and 18 connected to the battery receiving portion 106a have based on the received ID information.

In FIG. 6, the battery pack 14 having an alarm function is attached to the adapter 200. In this case, the main controller 150 can detect that the battery pack 14 has the alarm function based on the ID information received from the battery pack 14. When the battery pack 14 has the alarm function, the main controller 150 ignores the measurement by the measuring portion 134 and stops power supply to the motor 60 only when the alarm signal of the battery pack 14 is received. Specifically, the main controller 150 outputs an alarm signal from the tool-side alarm terminal 178 to the main body 52 of the electric power tool and turns off the power FET 64 in the main body 52 of the electric power tool. In this example, the alarm signal output by the battery pack 14 has a higher priority than the charged level of the battery pack 14 measured by the adapter 200. This is because in many cases, the measurement by the battery pack 14 provides a more accurate determination result than the measurement by the adapter 200.

In FIG. 7, the battery pack 16 that does not have the alarm function is attached to the adapter 200. In this case, the main controller 150 can detect that the battery pack 16 does not have the alarm function based on the ID information received from the battery pack 16. When the battery pack 16 does not have the alarm function, the main controller 150 stops power supply to the motor 60 according to the measurement by the measuring portion 134 similarly to the first embodiment. As a result, it is possible to prevent the overdischarging of the battery pack 16 regardless of whether the battery pack 16 has the alarm function or not.

In FIG. 8, the battery pack 18 having an auto stop function is attached to the adapter 200. This battery pack 18 includes a power FET 44 and a shunt resistor 42. The battery controller 22 monitors the charged level of each battery cell 20 by measuring the voltage of each battery cell 20. Moreover, when the charged level of at least one battery cell 20 is out of an allowable range, the battery controller 22 turns off the power FET 44 and spontaneously stops the discharging of the battery pack 18. Moreover, when a current value measured using the shunt resistor 42 exceeds an allowable value that is stored, the battery controller 22 turns off the power FET 44 and automatically stops the discharging of the battery pack 18. As above, the function that allows the battery pack 18 to measure its state by itself and to automatically stop discharging is referred to as an auto stop function.

The main controller 150 can detect that the battery pack 18 has the auto stop function based on the ID information received from the battery pack 18. When the battery pack 18 has the auto stop function, the main controller 150 ignores the measurement by the measuring portion 134. That is, a process of allowing the battery pack 18 to spontaneously stop discharging is performed preferentially, and a process of allowing the adapter 200 to stop discharging is not performed. As a result, the overdischarging of the battery pack 18 is prevented by the auto stop function of the battery pack 18. In the adapter 200 of the present embodiment, the auto stop function of the battery pack 18 is performed preferentially than the process of the adapter 200, and the discharging of the battery pack 18 is stopped at an appropriate point in time.

As described above, the adapter 200 of the present embodiment can determine whether or not each of the battery packs 14, 16, and 18 attached to the battery receiving portion 106a has the alarm function and the auto stop function. Moreover, when the battery pack 14 has the alarm function (see FIG. 6), the adapter 200 does not stop power supply to the main body 52 of the electric power tool unless the alarm signal is received from the battery packs 14, 16, and 18 regardless of the measurement by the measuring portion 134. When the battery pack 16 does not have the alarm function (see FIG. 7), the adapter 200 stops power supply to the main body 52 of the electric power tool according to the measurement by the measuring portion 134. Therefore, it is possible to prevent overdischarging of the battery packs 14 and 16 regardless of whether the battery pack has the alarm function or not. However, when the battery pack 18 has the auto stop function (see FIG. 8), the adapter 200 does not perform a process of stopping discharging of the battery pack 18 by ignoring the measurement by the measuring portion 134. This is because in many cases, the measurement by the battery pack 18 provides a more accurate determination result than the measurement by the adapter 200.

Embodiment 3

An adapter 300 according to a third embodiment will be described with reference to FIGS. 9 and 10. In the adapter 300 of the third embodiment, the two battery-side alarm terminals 118 and the cut-off switches 132, the level shifters 136 and 138, and the transistors 140 and 142 connected to the battery-side alarm terminals 118 are removed from the configuration of the adapter 200 of the second embodiment. Moreover, a portion of the program of the main controller 150 is modified. Since the other constituent components are the same as those of the first and second embodiments, these constituent components will be denoted by the same reference numerals as those of the first and second embodiments, and overlapping description thereof will not be provided.

The adapter 300 of the third embodiment has the ID terminal 220 and can acquire the ID information of the battery packs 14, 16, and 18 similarly to the adapter 200 of the second embodiment. Thus, the adapter 300 can determine whether or not each of the battery packs 14, 16, and 18 attached to the battery receiving portion 106a has at least the auto stop function.

On the other hand, the adapter 300 of the third embodiment does not have the battery-side alarm terminal 118 and cannot receive the alarm signal output by the battery packs 10 and 14 unlike the adapters 100 and 200 of the first and second embodiments. Thus, the main controller 150 of the adapter 300 stops power supply to the main body 52 of the electric power tool according to the measurement by the measuring portion 134 even when the battery packs 10 and 14 have the alarm function. Due to this, the adapter 200 can prevent the overdischarging of the battery packs 10 and 14 although the adapter 200 cannot receive the alarm signal.

Figure 9:
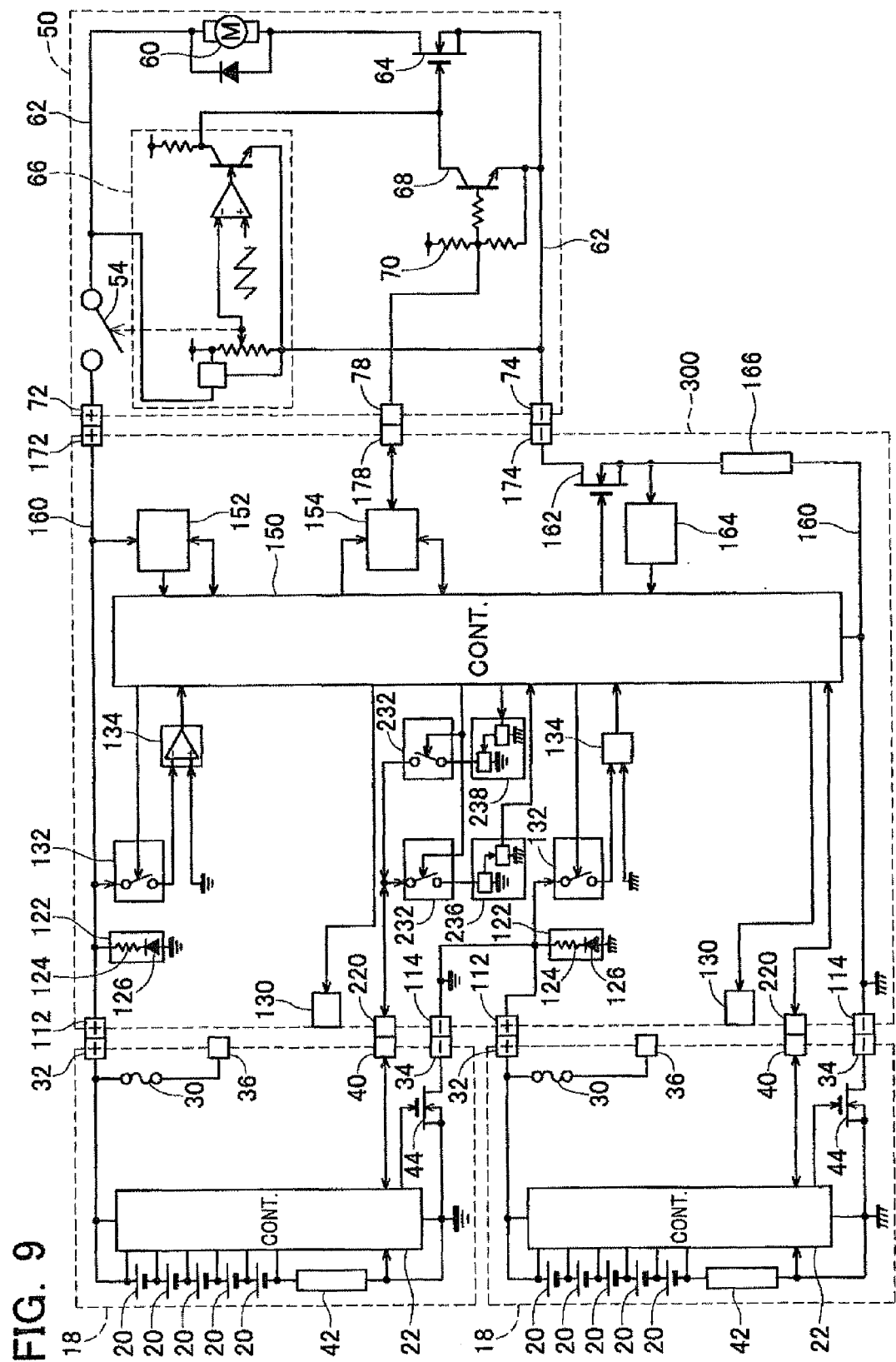
FIG. 9 is a view illustrating a circuit configuration of an adapter, a main body of an electric power tool, and a battery pack (with an auto stop function and an ID terminal) according to a third embodiment.

However, as illustrated in FIG. 9, when the battery pack 18 has the auto stop function, the main controller 150 ignores the measurement by the measuring portion 134. That is, the adapter 300 does not perform a process of stopping the discharging of the battery pack 18 even when the measurement by the measuring portion 134 is out of an allowable range. As a result, the overdischarging of the battery pack 18 is prevented by the auto stop function of the battery pack 18. In the adapter 300 of the present embodiment, the auto stop function of the battery pack 18 is performed preferentially than the process of the adapter 300, and the discharging of the battery pack 18 is stopped at an appropriate point in time.

Figure 10:
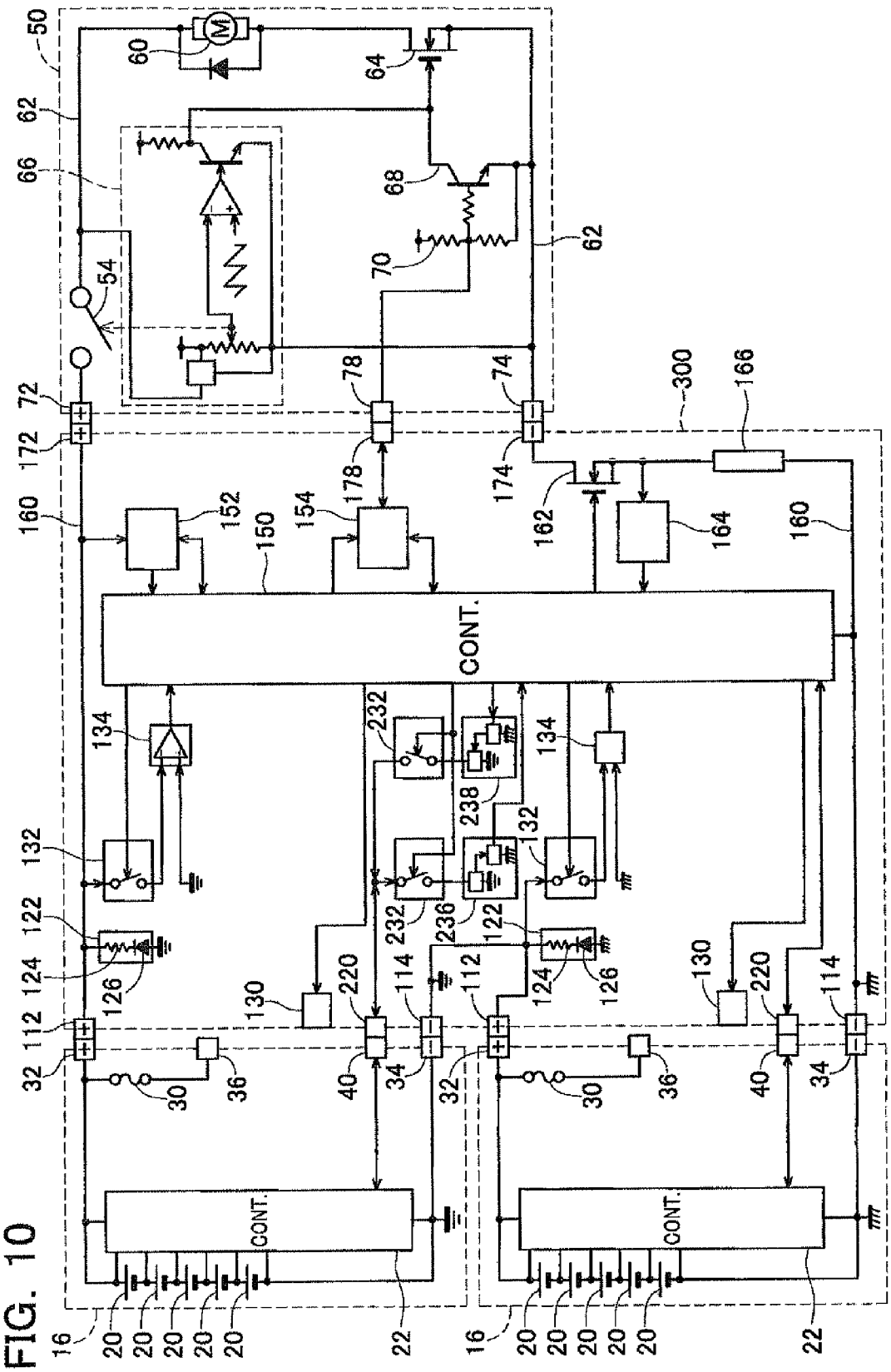
FIG. 10 is a view illustrating a circuit configuration of the adapter, the main body of the electric power tool, and the battery pack (without an auto stop function and with an ID terminal) according to the third embodiment.

In contrast, as illustrated in FIG. 10, when the battery pack 16 does not have the auto stop function, power supply to the main body 52 of the electric power tool is stopped according to the measurement by the measuring portion 134 regardless of whether the battery pack 16 has the alarm function or not.

As described above, the adapter 300 of the present embodiment can prevent the overdischarging of the battery packs 16 and 18 regardless of whether the battery packs 16 and 18 have the auto stop function or not. Further, as for the battery pack 18 having the auto stop function, by performing the auto stop function thereof preferentially, it is possible to stop the discharging of the battery pack 18 at an appropriately point in time.

Figure 11:
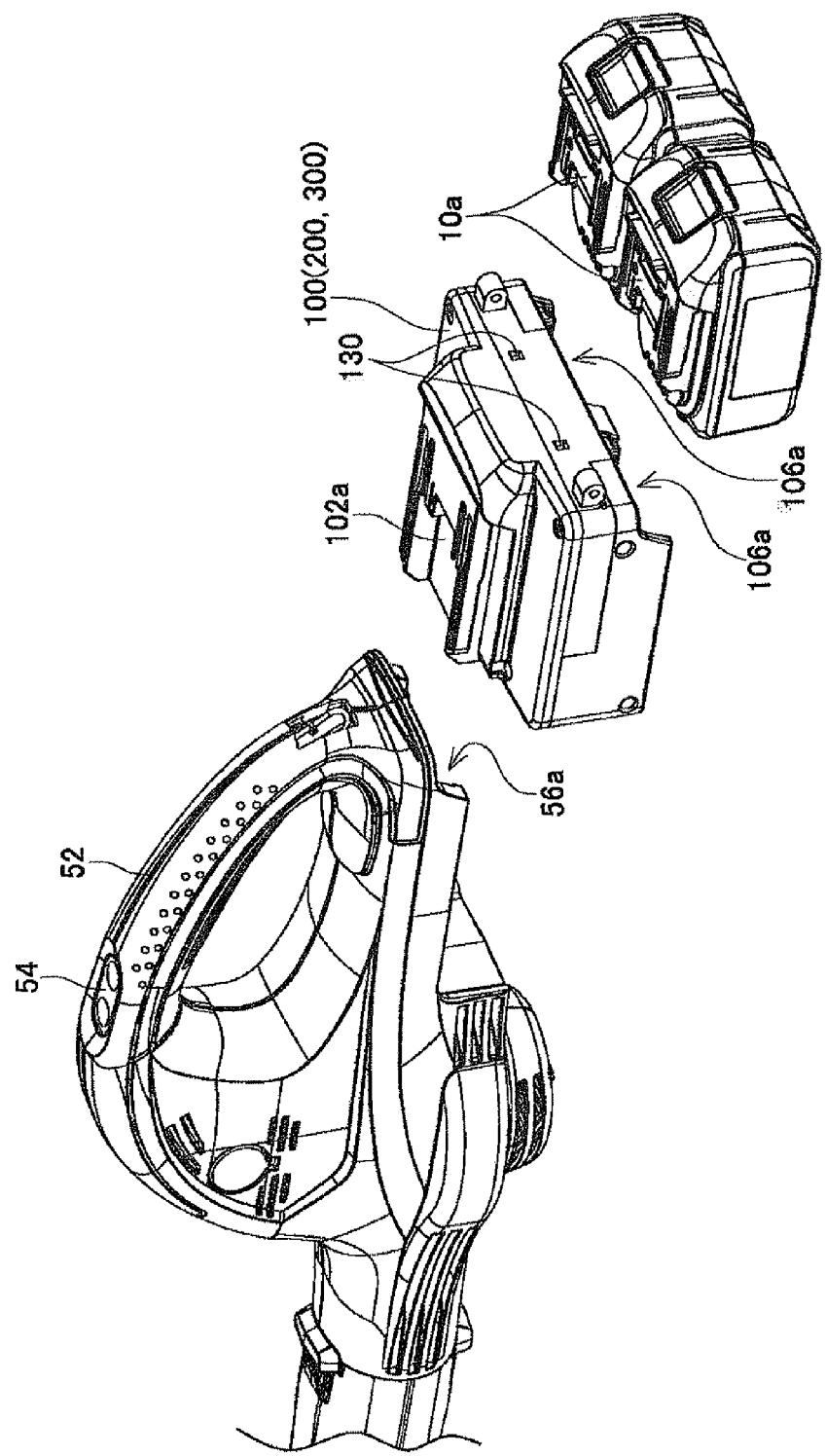
FIG. 11 is an external view illustrating an integrated adapter.
Figure 12:
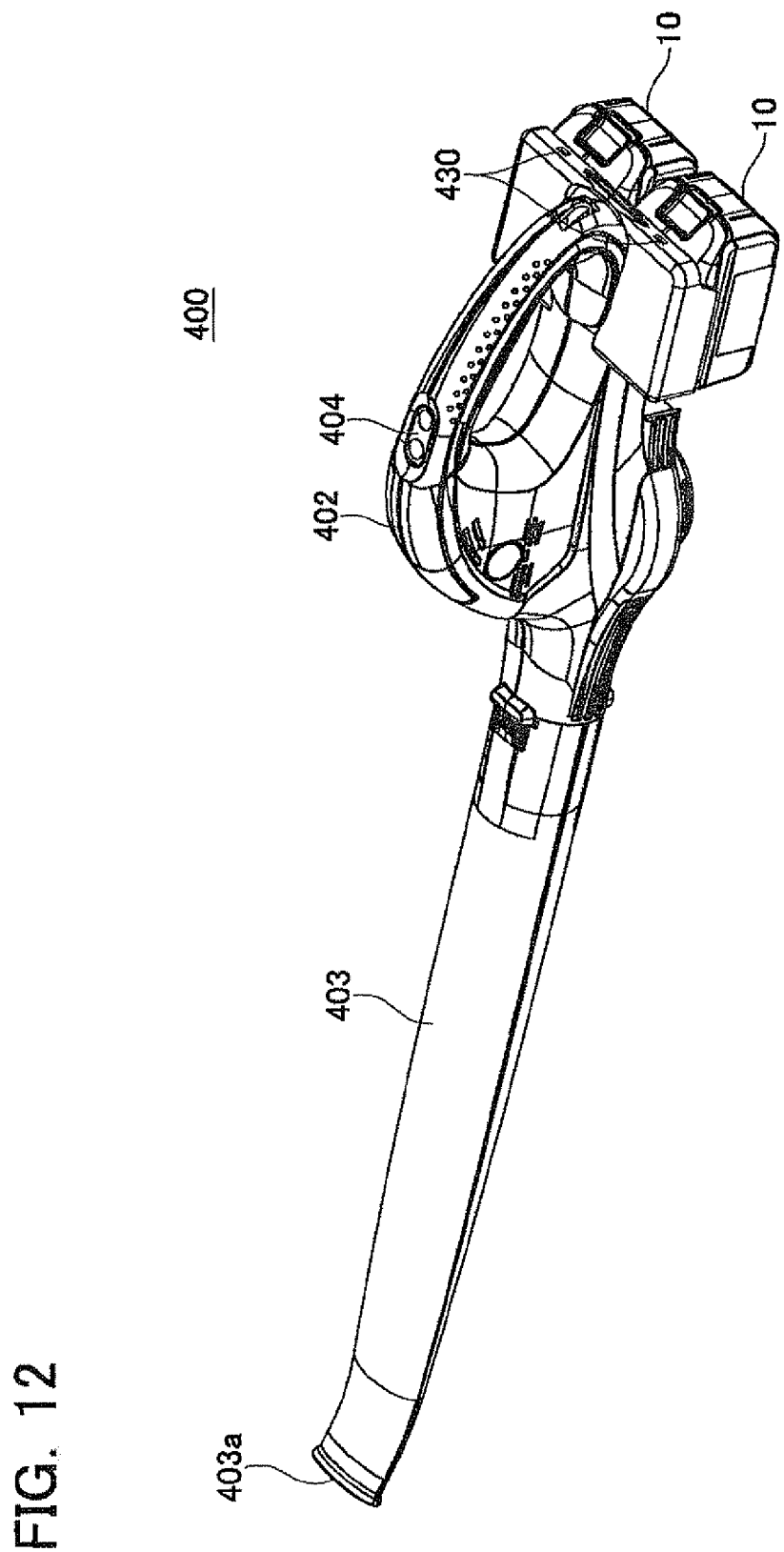
FIG. 12 is an external view illustrating an electric power tool according to an embodiment in a state where a battery pack is attached thereto.

As illustrated in FIGS. 1, 2, and 3, the adapters 100, 200, and 300 have a structure in which the tool-side unit 102 and the battery-side unit 106 are connected by the electric cord 104. However, as illustrated in FIG. 11, the adapters 100, 200, and 300 may have a cordless configuration in which the adapter is formed of a single housing. In this case, for example, the connecter portion 102a may be formed on an upper surface of the housing, and the battery receiving portion 106a may be formed on a lower surface of the housing.

Embodiment 4

An electric power tool 400 according to a fourth embodiment will be described with reference to FIGS. 12 to 15. The electric power tool 400 of the present embodiment corresponds to one in which the adapter 100 of the first embodiment illustrated in FIGS. 1 to 5 is integrated with the main body 52 of the electric power tool.

The electric power tool 400 is an electric power blower that is powered by two battery packs 10. This electric power tool drives a blast fan included in a main body 402 according to an operation on a main switch 404 and blows air from a distal end 403a of a nozzle 403. The configuration of the electric power tool 400 described in the present embodiment is not limited to an electric power blower and can be broadly applied to various cordless electric power tools that are powered by battery packs.

Figure 13:
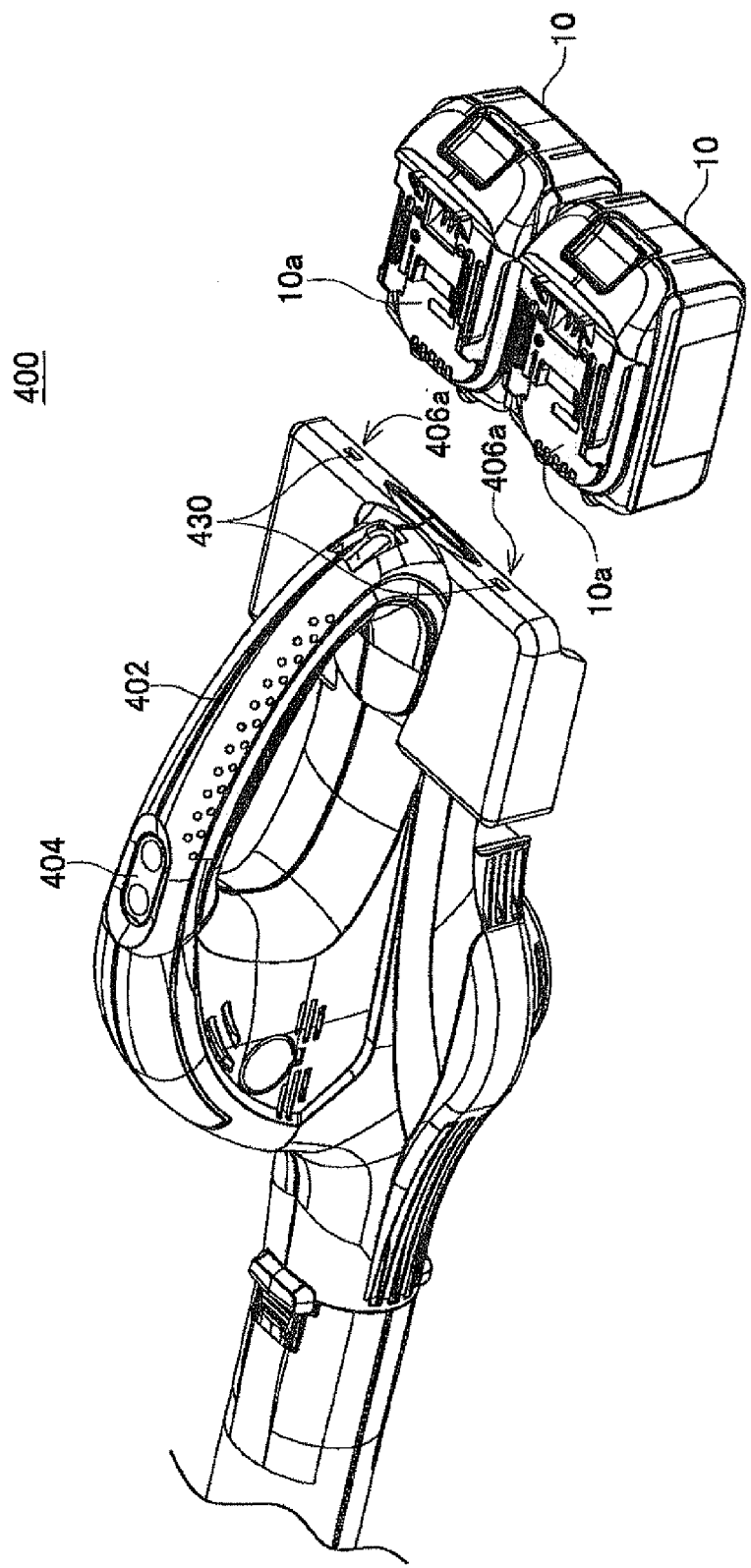
FIG. 13 is an external view illustrating the electric power tool according to the embodiment in a state where the battery pack is detached therefrom.
Figure 14:
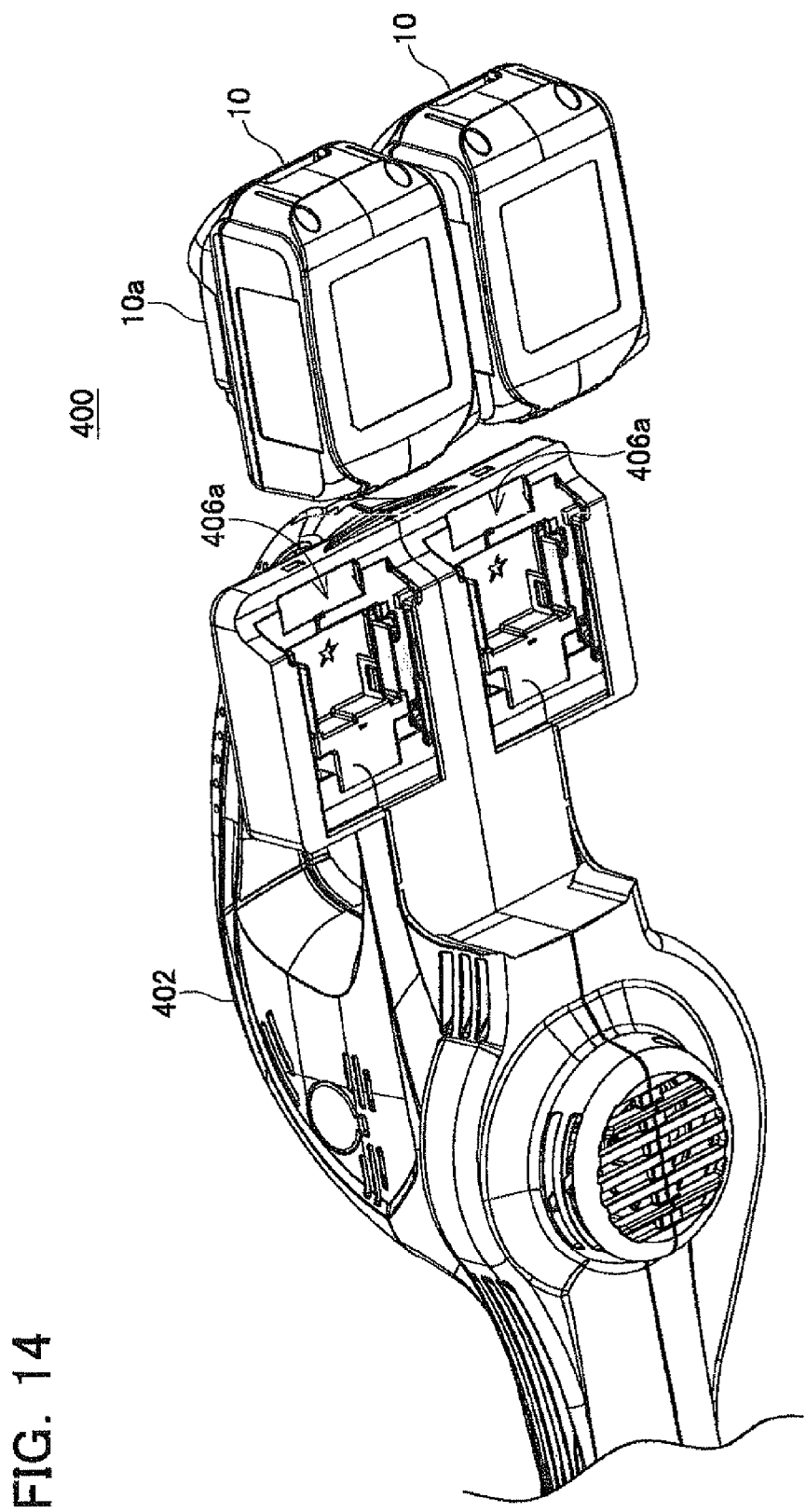
FIG. 14 is an external bottom view illustrating the electric power tool according to the embodiment in a state where the battery pack is detached therefrom.

As illustrated in FIGS. 13 and 14, two battery receiving portions 406a are formed in the main body 402. Each battery receiving portion 406a detachably engages with a connecter portion 10a of the battery pack 10. Due to this, it is possible to detachably attach the battery pack 10 having a nominal voltage of 18 volts to each battery receiving portion 406a. The two battery packs 10 attached to the main body 402 are electrically connected to the main body 402, and power from the two battery packs 10 is supplied to the main body 402.

Figure 15:
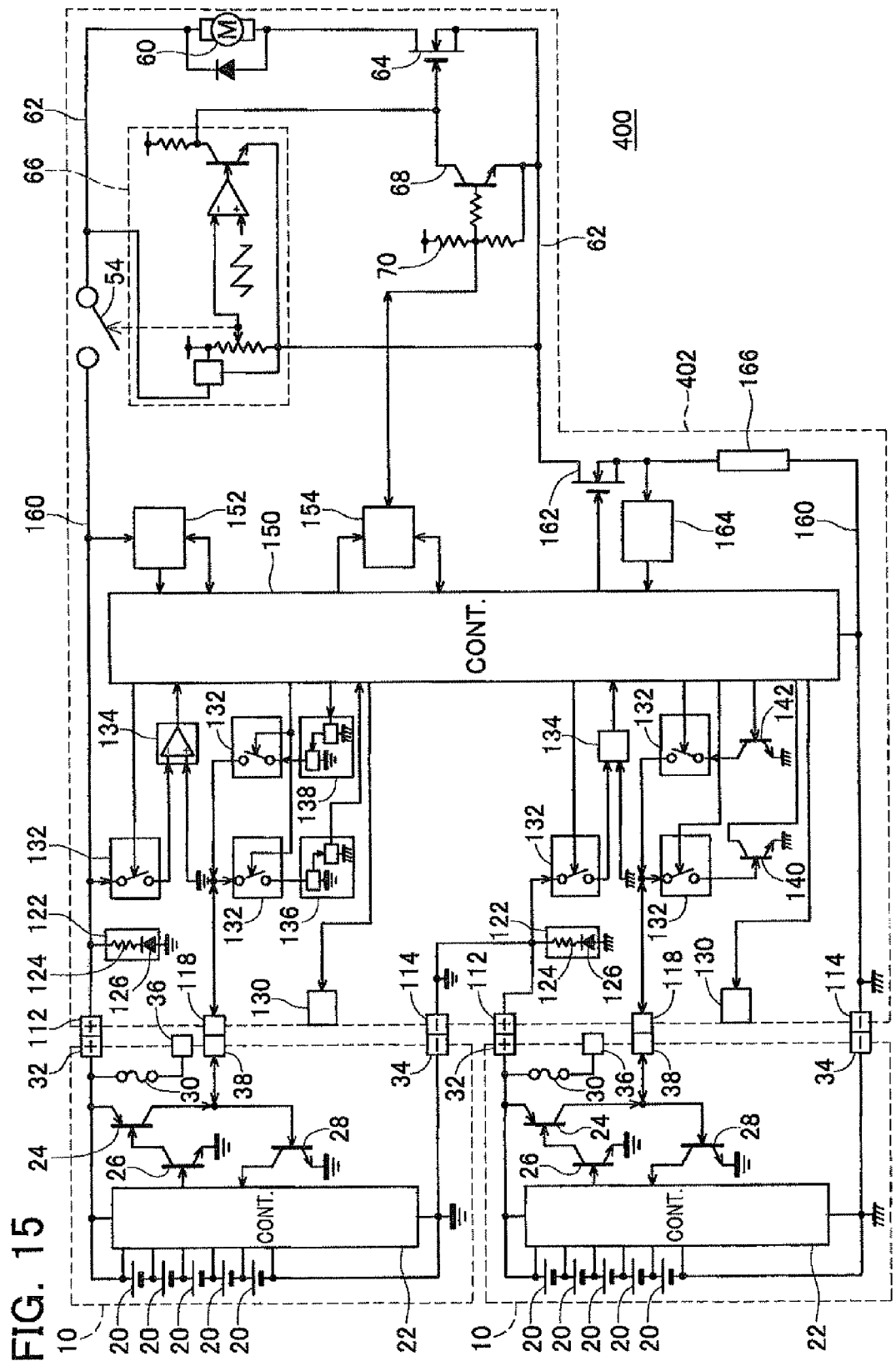
FIG. 15 is a view illustrating a circuit configuration of a main body of an electric power tool and a battery pack (with an alarm function) according to a fourth embodiment.

FIG. 15 illustrates a circuit configuration of the electric power tool 400. As is clear from the comparison between FIG. 4 and FIG. 15, a circuit configuration of the main body 402 of the electric power tool 400 illustrated in FIG. 15 is approximately the same as a circuit configuration in which the main body 52 of the electric power tool and the adapter 100 illustrated in FIG. 4 are integrated with each other. Thus, the constituent components of FIG. 15 will be denoted by the same reference numerals as the corresponding constituent components of the first embodiment, and overlapping description thereof will not be provided.

According to this electric power tool 400, it is possible to stop the discharging of the battery pack 10 according to the alarm signal output by the battery pack 10 similarly to the adapter 100 of the first embodiment. Moreover, even when the alarm signal is not output from the battery pack 10, it is possible to stop the discharging of the battery pack 10 according to the measured output voltage of the battery pack 10. Thus, even when the battery pack 10 does not have the alarm function, it is possible to stop the discharging of the battery pack 10 according to the measured output voltage of the battery pack 10. The electric power tool 400 can prevent the overdischarging of the battery pack 10 regardless of whether the battery pack 10 has the alarm function or not.

Embodiment 5

An electric power tool 500 according to a fifth embodiment will be described with reference to FIG. 16. In the electric power tool 500 of the present embodiment, two ID terminals 220, two cut-off switches 232, and two level shifters 236 and 238 are added to the configuration of the electric power tool 400 of the fourth embodiment. Moreover, a portion of the program of the main controller 150 is modified. In other words, the electric power tool 500 of the present embodiment corresponds to one in which the main body 52 of the electric power tool illustrated in FIGS. 6, 7, and 8 is integrated with the adapter 200 of the second embodiment.

Figure 16:
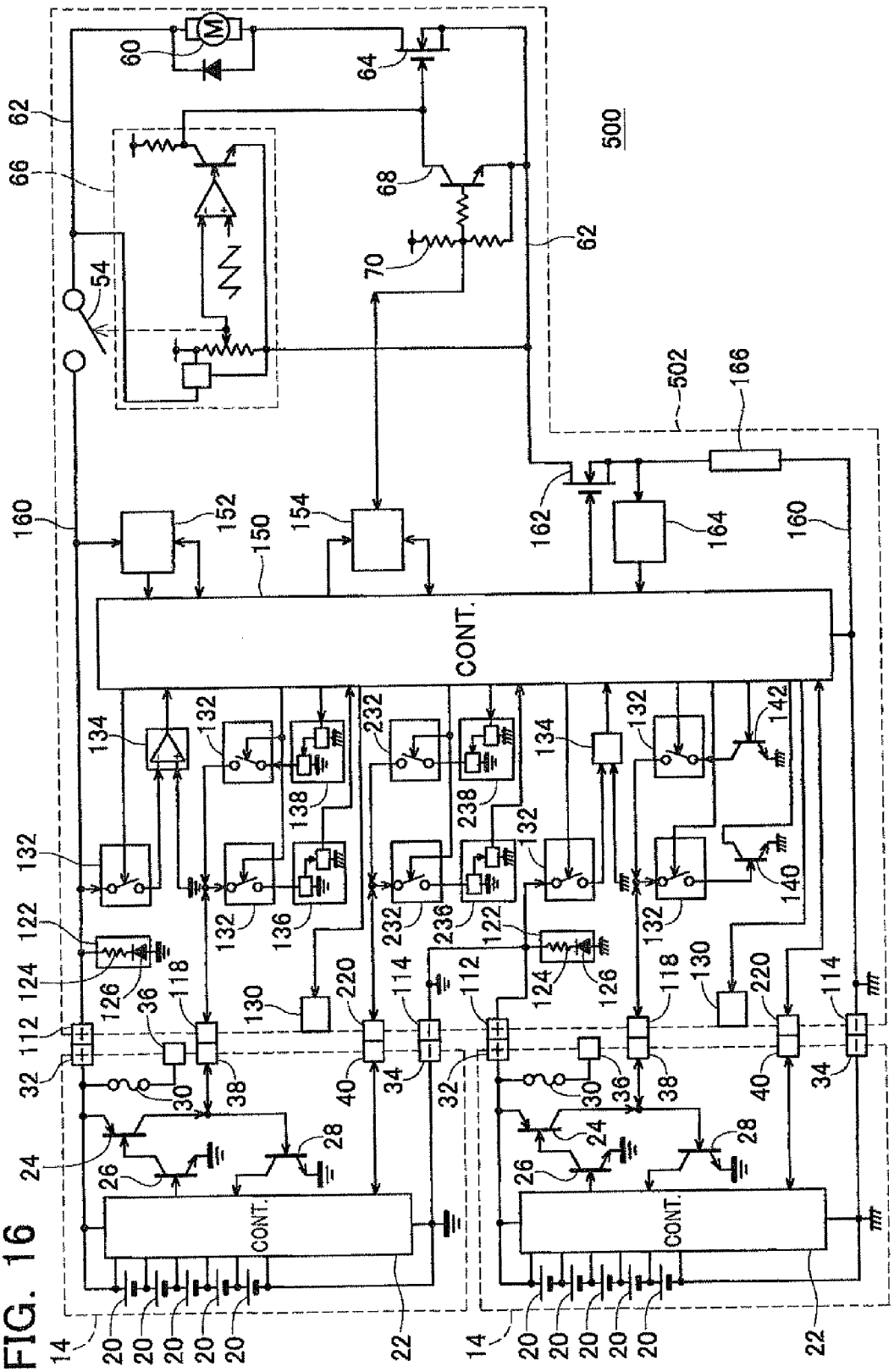
FIG. 16 is a view illustrating a circuit configuration of a main body of an electric power tool and a battery pack (with an alarm function and an ID terminal) according to a fifth embodiment.

FIG. 16 illustrates a circuit configuration of the electric power tool 500. As is clear from the comparison between FIG. 6 and FIG. 16, a circuit configuration of the main body 502 of the electric power tool 500 illustrated in FIG. 16 is approximately the same as a circuit configuration in which the main body 52 of the electric power tool and the adapter 200 illustrated in FIG. 6 are integrated with each other. Thus, the constituent components of FIG. 16 will be denoted by the same reference numerals as the corresponding constituent components of the second embodiment, and overlapping description thereof will not be provided.

In this electric power tool 500, similarly to the adapter 200 of the second embodiment, the main controller 150 can determine whether or not the battery pack 14 attached to the battery receiving portion 106a has the alarm function and the auto stop function. Moreover, when the battery pack 14 has the alarm function, the main body 502 of the electric power tool 500 does not stop power supply to the motor 60 unless the main controller 150 receives the alarm signal from the battery pack 14 regardless of the measurement by the measuring portion 134. On the other hand, when the battery pack 16 does not have the alarm function, the main controller 150 allows the main body 502 to stop power supply to the motor 60 according to the measurement by the measuring portion 134. However, when the battery pack 14 has the auto stop function, the main controller 150 does not perform the process of stopping the discharging of the battery pack 14 by ignoring the measurement by the measuring portion 134. As a result, the auto stop function of the battery pack 14 is performed preferentially than the process of the main body 502 of the electric power tool 500, and the discharging of the battery pack 14 is stopped at an appropriate point in time.

Embodiment 6

An electric power tool 600 according to a sixth embodiment will be described with reference to FIG. 17. In the electric power tool 600 of the present embodiment, two battery-side alarm terminals 118 and the cut-off switches 132, the level shifters 136 and 138, and the transistors 140 and 142 connected to the battery-side alarm terminals 118 are removed from the configuration of the electric power tool 500 of the fifth embodiment. In other words, the electric power tool 600 of the present embodiment corresponds to one in which the main body 52 of the electric power tool illustrated in FIGS. 9 and 10 is integrated with the adapter 300 of the third embodiment.

Figure 17:
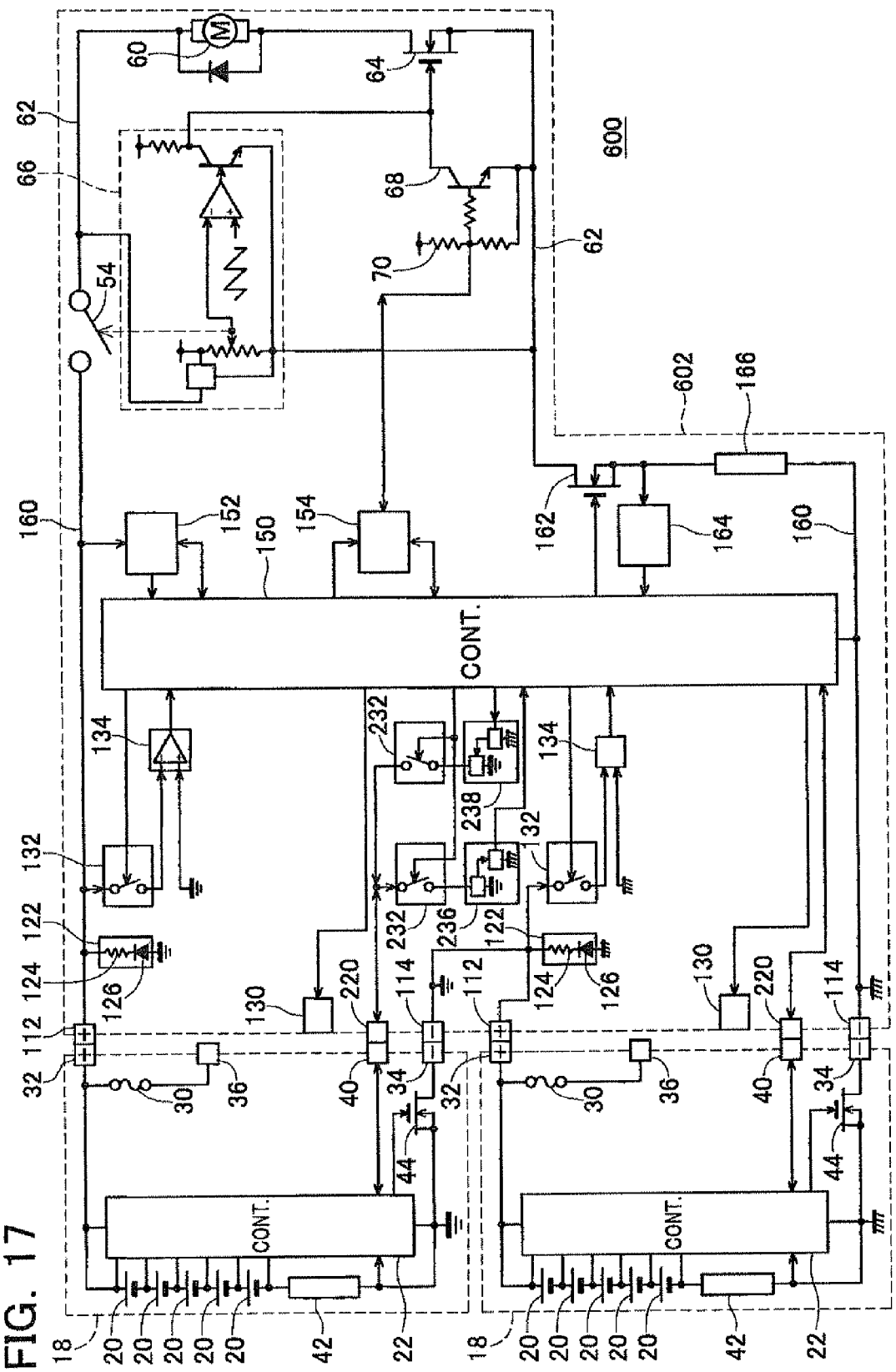
FIG. 17 is a view illustrating a circuit configuration of a main body of an electric power tool and a battery pack (with an auto stop function and an ID terminal) according to a sixth embodiment.

FIG. 17 illustrates a circuit configuration of the electric power tool 600. As is clear from the comparison between FIG. 9 and FIG. 17, a circuit configuration of the main body 602 of the electric power tool 600 illustrated in FIG. 17 is approximately the same as a circuit configuration in which the main body 52 of the electric power tool and the adapter 300 illustrated in FIG. 9 are integrated with each other. Thus, the constituent components of FIG. 17 will be denoted by the same reference numerals as the corresponding constituent components of the third embodiment, and overlapping description thereof will not be provided.

According to this electric power tool 600, similarly to the adapter 300 of the third embodiment, the math controller 150 can determine whether or not the battery pack 18 attached to the battery receiving portion 106a has the auto stop function. Moreover, when the battery pack 18 has the auto stop function, the main controller 150 ignores the measurement by the measuring portion 134. That is, the main controller 150 does not perform the process of stopping the discharging of the battery pack 18 even when the measurement by the measuring portion 134 is out of an allowable range. As a result, the overdischarging of the battery pack 18 is prevented by the auto stop function of the battery pack 18. In the electric power tool 600 of the present embodiment, the auto stop function of the battery pack 18 is performed preferentially than the process of the main body 602 of the electric power tool 600, and the discharging of the battery pack 18 is stopped at an appropriate point in time.

Specific embodiments of the present teachings are described above, but these merely illustrate some possibilities of the teachings and do not restrict the scope of the claims. The art set forth in the claims includes variations and modifications of the specific examples set forth above.

The technical elements disclosed in the specification or the drawings may be utilized separately or in all types of combinations, and are not limited to the combinations set forth in the claims at the time of filing of the application. Furthermore, the technology illustrated in the present specification or the drawings may simultaneously achieve a plurality of objects, and has technological utility by achieving one of those objects.

The invention claimed is:

1. An adapter for connecting a main body of an electric power tool and at least one battery pack to each other, the adapter comprising:
    a connecter portion configured to be detachably attached to the main body of the power tool;
    at least one battery receiving portion each configured to be detachably attached to any one of first and second battery packs alternatively, the first battery pack being configured to output an alarm signal when the first battery pack is in a predetermined condition and the second battery pack being configured not to output the alarm signal even when the second battery pack is in the predetermined condition;
    a power supply circuit configured to electrically couple the first battery pack or the second battery pack attached to the battery receiving portion to the main body of the electric power tool attached to the connecter portion;
    a measuring portion configured to measure an index corresponding to a charged level of the first battery pack or the second battery pack attached to the battery receiving portion;
    a signal receiving portion configured to receive the alarm signal outputted from the first battery pack attached to the battery receiving portion; and
    a controller portion configured to:
        detect which one of the first and second battery packs is attached to the battery receiving portion when the first or second battery pack is attached to the battery receiving portion,
        allow power supply through the power supply circuit regardless of the index measured by the measuring portion, while the first battery pack is attached to the battery receiving portion and the signal receiving portion does not receive the alarm signal,
        stop or restrict the power supply through the power supply circuit when the signal receiving portion receives the alarm signal, and
        stop or restrict the power supply through the power supply circuit based upon the index measured by the measuring portion while the second batter pack is attached to the battery receiving portion.

2. The adapter as in claim 1, wherein
    the at least one battery receiving portion includes a plurality of battery receiving portions, and
    the power supply circuit is configured to electrically couple the first and/or second battery packs attached to the plurality of battery receiving portions to the main body of the electric power tool.

3. The adapter as in claim 2, wherein the power supply circuit is configured to electrically connect in series the first and/or second battery packs attached to the plurality of battery receiving portions to the main body of the electric power tool.

4. The adapter as in claim 3, wherein
    each of the battery receiving portions comprises a pair of power input terminals, one of which is connected to a positive electrode of the first or second battery pack and the other is connected to a negative electrode of the first or second battery pack, and
    the pair of the power input terminals are electrically coupled with each other via a diode.

5. The adapter as in claim 1, wherein the alarm signal is a signal that the first battery pack outputs according to a decrease of the charged level.

6. The adapter as in claim 1, wherein the measuring portion is configured to measure an output voltage of the first or second battery pack attached to the battery receiving portion.

7. The adapter as in claim 1, wherein the controller portion is further configured to:
   detect whether or not the first or second battery pack attached to the battery receiving portion has an auto stop function that automatically stops discharging according a decrease of the charged level, and
   allow power supply through the power supply circuit regardless of the index measured by the measuring portion if the first or second battery pack attached to the battery receiving portion has the auto stop function.

8. The adapter as in claim 1, wherein the predetermined condition is a condition where the charged level of the first battery pack is out of an allowable level.

9. An electric power tool powered by at least one battery pack, the electric power tool comprising:
   a motor configured to drive a tool;
   at least one battery receiving portion each configured to be detachably attached to any one of first and second battery packs alternatively, the first battery pack being configured to output an alarm signal when the first battery pack is in a predetermined condition and the second battery pack being configured not to output the alarm signal even when the second battery pack is in the predetermined condition;
   a power supply circuit configured to electrically couple the first battery pack or the second battery pack attached to the battery receiving portion to the motor;
   a measuring portion configured to measure an index corresponding to a charged level of the first battery pack or the second battery pack attached to the battery receiving portion;
   a signal receiving portion configured to receive the alarm signal outputted from the first battery pack attached to the battery receiving portion; and
   a controller portion configured to:
      detect which one of the first and second battery packs is attached to the battery receiving portion when the first or second batter pack is attached to the battery receiving portion,
      allow power supply through the power supply circuit regardless of the index measured by the measuring portion, while the first battery pack is attached to the battery receiving portion and the signal receiving portion does not receive the alarm signal,
      stop or restrict the power supply through the power supply circuit when the signal receiving portion receives the alarm signal, and
      stop or restrict the power supply through the power supply circuit based upon the index measured by the measuring portion while the second battery pack is attached to the battery receiving portion.

10. The electric power tool as in claim 9, wherein the predetermined condition is a condition where the charged level of the first battery pack is out of an allowable level.

11. The electric power tool as in claim 9, further comprising:
    a diode comprising a cathode and an anode and configured such that, when the first or second battery pack is attached to the battery receiving portion, the cathode is electrically connected to a positive electrode of the first or second battery pack and the anode is electrically connected to a negative electrode of the first or second battery pack.

12. An electric power tool powered by at least one battery pack, the electric power tool comprising:
    a motor configured to drive a tool;
    at least one battery receiving portion each configured to be detachably attached to any of first and second battery packs alternatively, the first battery pack being configured to automatically stop discharging when the first battery pack is in a predetermined condition and the second battery pack being configured not to automatically stop discharging even when the second battery pack is in the predetermined condition;
    a power supply circuit configured to electrically couple the first battery pack or the second battery pack attached to the battery receiving portion to the motor;
    a measuring portion configured to measure an index corresponding to a charged level of the first battery pack or the second battery pack attached to the battery receiving portion; and
    a controller portion configured to
       detect which one of the first and second battery packs is attached to the battery receiving portion when the first or second battery pack is attached to the battery receiving portion,
       allow power supply through the power supply circuit regardless of the index measured by the measuring portion while the first battery pack is attached to the batter receiving portion, and
       stop or restrict the power supply through the power supply circuit based upon the index measured by the measuring portion while the second battery pack is attached to the battery receiving portion.

13. The electric power tool as in claim 12, wherein the predetermined condition is a condition where the charged level of the first battery pack is out of an allowable level.

14. The electric power tool as in claim 12, further comprising:
    a diode comprising a cathode and an anode and configured such that, when the first or second battery pack is attached to the battery receiving portion, the cathode is electrically connected to a positive electrode of the first or second battery pack and the anode is electrically connected to a negative electrode of the first or second battery pack.

15. An adapter for connecting a main body of an electric power tool and at least one battery pack to each other, the adapter comprising:
    a connecter portion configured to be detachably attached to the main body of the power tool;
    at least one battery receiving portion each configured to be detachably attached to any one of first and second battery packs alternatively, the first battery pack being configured to automatically stop discharging when the first battery pack is in a predetermined condition and the second battery pack being configured not to automatically stop discharging even when the second battery pack is in the predetermined condition;
    a power supply circuit configured to electrically couple the first battery pack or the second battery pack attached to the battery receiving portion to the main body of the electric power tool attached to the connecter portion;
    a measuring portion configured to measure an index corresponding to a charged level of the first battery pack or the second battery pack attached to the battery receiving portion; and a controller portion configured to
> detect which one of the first and second battery packs is attached to the battery receiving portion when the first or second battery pack is attached to the battery receiving portion,
> allow power supply through the power supply circuit regardless of the index measured by the measuring portion while the first battery pack is attached to the battery receiving portion, and
> stop or restrict the power supply through the power supply circuit based upon the index measured by the measuring portion while the second battery pack is attached to the battery receiving portion.

16. The adapter as in claim 15, wherein
the at least one battery receiving portion includes a plurality of battery receiving portions, and
the power supply circuit is configured to electrically couple a plurality of first and/or second battery packs attached to the plurality of battery receiving portions to the main body of the electric power tool.

17. The adapter as in claim 16, wherein the power supply circuit is configured to electrically connect in series the plurality of first and/or second battery packs attached to the plurality of battery receiving portions to the main body of the electric power tool.

18. The adapter as in claim 17, wherein
each of the battery receiving portions comprises a pair of power input terminals, one of which is configured to be connected to a positive electrode of the first or second battery pack and the other is configured to be connected to a negative electrode of the first or second battery pack, and
the pair of the power input terminals are electrically coupled with each other via a diode.

19. The adapter as in claim 15, wherein the predetermined condition is a condition where the charged level of the first battery pack is out of an allowable level.

* * * * *